(12) United States Patent
Tsuda et al.

(10) Patent No.: US 10,003,101 B2
(45) Date of Patent: Jun. 19, 2018

(54) NON-AQUEOUS ELECTROLYTIC SOLUTION, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Ryohei Tsuda, Kanagawa (JP); Kazumasa Takeshi, Kanagawa (JP); Tadahiko Kubota, Kanagawa (JP)

(73) Assignee: Murata Manufacturing Co., Ltd., Tokyo (JP)

( * ) Notice: Subject to any disclaimer, the term of this patent is extended or adjusted under 35 U.S.C. 154(b) by 481 days.

(21) Appl. No.: 14/596,741

(22) Filed: Jan. 14, 2015

(65) Prior Publication Data

US 2015/0214576 A1 Jul. 30, 2015

(30) Foreign Application Priority Data

Jan. 29, 2014 (JP) .................................. 2014-013905

(51) Int. Cl.
| | |
|---|---|
| *H01M 10/0567* | (2010.01) |
| *H01M 10/052* | (2010.01) |
| *H02J 7/00* | (2006.01) |
| *B60K 1/04* | (2006.01) |
| *B60L 11/18* | (2006.01) |
| *H02J 7/14* | (2006.01) |
| *B60L 11/12* | (2006.01) |
| *B60L 11/14* | (2006.01) |

(52) U.S. Cl.
CPC .......... *H01M 10/0567* (2013.01); *B60K 1/04* (2013.01); *B60L 11/123* (2013.01); *B60L 11/14* (2013.01); *B60L 11/1879* (2013.01); *H02J 7/007* (2013.01); *H02J 7/14* (2013.01); *H01M 10/052* (2013.01); *H01M 2300/0025* (2013.01); *H02J 7/0021* (2013.01); *Y02E 60/122* (2013.01); *Y02T 10/7011* (2013.01); *Y02T 10/7055* (2013.01)

(58) Field of Classification Search
CPC .......... H01M 10/052; H01M 10/0567; H01M 2300/0025; H02J 7/007; H02J 7/0021; H02J 7/14; B60L 11/1851; B60K 1/04; Y02E 60/122; Y02T 10/7011; Y02T 10/7055
See application file for complete search history.

(56) References Cited

U.S. PATENT DOCUMENTS

| | | | | |
|---|---|---|---|---|
| 7,790,312 | B2 * | 9/2010 | Costello | ............ H01M 10/0569 |
| | | | | 429/188 |
| 2012/0265385 | A1 * | 10/2012 | Funada | ............. H01M 10/0525 |
| | | | | 701/22 |

* cited by examiner

Primary Examiner — Brittany Raymond
(74) Attorney, Agent, or Firm — K&L Gates LLP

(57) ABSTRACT

A secondary battery includes a cathode, an anode, and non-aqueous electrolytic solution. The non-aqueous electrolytic solution includes a boron compound. The boron compound includes six or more boron (B) atoms, and includes an octavalent boron-hydrogen-containing structure represented by Formula (1), a dodecavalent boron-carbon-containing structure represented by Formula (2), or both.

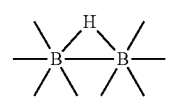

(1)

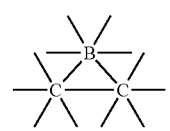

(2)

12 Claims, 8 Drawing Sheets

NON-AQUEOUS ELECTROLYTIC SOLUTION, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application claims priority to Japanese Priority Patent Application JP 2014-013905 filed in the Japan Patent Office on Jan. 29, 2014, the entire content of which is hereby incorporated by reference.

BACKGROUND

The present application relates to non-aqueous electrolytic solution that is used in a secondary battery, to a secondary battery that uses the non-aqueous electrolytic solution, and to a battery pack, an electric vehicle, an electric power storage system, an electric power tool, and an electronic apparatus that use the secondary battery.

In recent years, various electronic apparatuses such as a mobile phone and a mobile information terminal device (PDA) have been widely used, and it has been demanded to further reduce the size and the weight of the electronic apparatuses and to achieve their longer lives. Accordingly, as an electric power source, a battery, in particular, a small and light-weight secondary battery capable of achieving high energy density has been developed.

In these days, it has been considered to apply a secondary battery to various other applications in addition to the electronic apparatuses described above. Examples of such applications other than the electronic apparatuses may include a battery pack attachably and detachably mounted on the electronic apparatuses or the like, an electric vehicle such as an electric automobile, an electric power storage system such as a home electric power server, and an electric power tool such as an electric drill.

There have been proposed secondary batteries that utilize various charge and discharge principles in order to obtain battery capacity. In particular, attention has been paid to a secondary battery that utilizes insertion and extraction or precipitation and dissolution of an electrode reactant, because higher energy density is achieved in such secondary batteries than in a lead battery, a nickel-cadmium battery, etc.

A secondary battery includes a cathode, an anode, and non-aqueous electrolytic solution. The cathode includes a cathode active material related to charge and discharge reactions, and the anode includes an anode active material related to charge and discharge reactions. The non-aqueous electrolytic solution includes a non-aqueous solvent and an electrolyte salt. A composition of the non-aqueous electrolytic solution largely influences battery characteristics of the secondary battery. Various considerations are therefore made on the composition of the non-aqueous electrolytic solution.

Specifically, in order to achieve higher battery capacity, etc. a compound including boron (B) as a constituent element is contained in the non-aqueous electrolytic solution (for example, see Japanese Unexamined Patent Application Publication No. 2013-131394, and Japanese Patent Nos. 5013776 and 4610490).

SUMMARY

An electronic apparatus, etc. have been gaining higher performance and more functions. In accordance therewith, frequency in use of the electronic apparatus, etc. has increased, which results in a tendency of frequent charge and discharge of a secondary battery. Accordingly, there is still a room for improvement in battery characteristics of the secondary battery.

It is desirable to provide non-aqueous electrolytic solution, a secondary battery, a battery pack, an electric vehicle, an electric power storage system, an electric power tool, and an electronic apparatus that are capable of achieving superior battery characteristics.

According to an embodiment of the present application, there is provided non-aqueous electrolytic solution including a boron compound. The boron compound includes six or more boron (B) atoms, and includes an octavalent boron-hydrogen-containing structure represented by Formula (1), a dodecavalent boron-carbon-containing structure represented by Formula (2), or both.

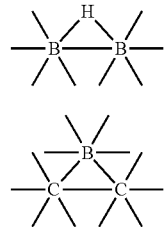

According to an embodiment of the present application, there is provided a secondary battery including a cathode, an anode, and non-aqueous electrolytic solution. The non-aqueous electrolytic solution includes a boron compound. The boron compound includes six or more boron (B) atoms, and includes an octavalent boron-hydrogen-containing structure represented by Formula (1), a dodecavalent boron-carbon-containing structure represented by Formula (2), or both.

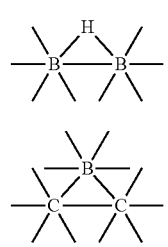

According to an embodiment of the present application, there is provided a battery pack including: a secondary battery; a control section configured to control operation of the secondary battery; and a switch section configured to switch the operation of the secondary battery according to an instruction of the control section. The secondary battery includes a cathode, an anode, and non-aqueous electrolytic solution. The non-aqueous electrolytic solution includes a boron compound. The boron compound includes six or more boron (B) atoms, and includes an octavalent boron-hydrogen-containing structure represented by Formula (1), a dodecavalent boron-carbon-containing structure represented by Formula (2), or both.

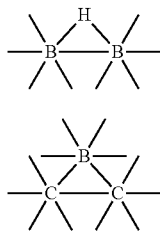

(1)

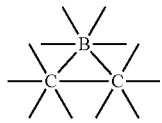

(2)

According to an embodiment of the present application, there is provided an electric vehicle including: a secondary battery; a conversion section configured to convert electric power supplied from the secondary battery into drive power; a drive section configured to operate according to the drive power; and a control section configured to control operation of the secondary battery. The secondary battery includes a cathode, an anode, and non-aqueous electrolytic solution. The non-aqueous electrolytic solution includes a boron compound. The boron compound includes six or more boron (B) atoms, and includes an octavalent boron-hydrogen-containing structure represented by Formula (1), a dodecavalent boron-carbon-containing structure represented by Formula (2), or both.

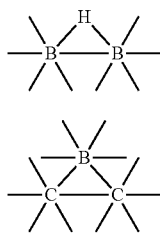

(1)

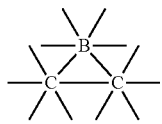

(2)

According to an embodiment of the present application, there is provided an electric power storage system including: a secondary battery; one or more electric devices configured to be supplied with electric power from the secondary battery; and a control section configured to control the supplying of the electric power from the secondary battery to the one or more electric devices. The secondary battery includes a cathode, an anode, and non-aqueous electrolytic solution. The non-aqueous electrolytic solution includes a boron compound. The boron compound includes six or more boron (B) atoms, and includes an octavalent boron-hydrogen-containing structure represented by Formula (1), a dodecavalent boron-carbon-containing structure represented by Formula (2), or both.

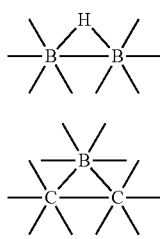

(1)

(2)

According to an embodiment of the present application, there is provided an electric power tool including: a secondary battery; and a movable section configured to be supplied with electric power from the secondary battery. The secondary battery includes a cathode, an anode, and non-aqueous electrolytic solution. The non-aqueous electrolytic solution includes a boron compound. The boron compound includes six or more boron (B) atoms, and includes an octavalent boron-hydrogen-containing structure represented by Formula (1), a dodecavalent boron-carbon-containing structure represented by Formula (2), or both.

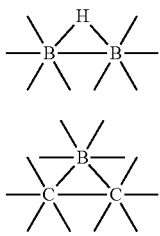

(1)

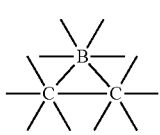

(2)

According to an embodiment of the present application, there is provided an electronic apparatus including a secondary battery as an electric power supply source. The secondary battery includes a cathode, an anode, and non-aqueous electrolytic solution. The non-aqueous electrolytic solution includes a boron compound. The boron compound includes six or more boron (B) atoms, and includes an octavalent boron-hydrogen-containing structure represented by Formula (1), a dodecavalent boron-carbon-containing structure represented by Formula (2), or both.

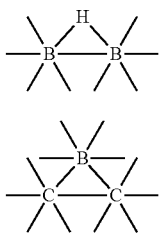

(1)

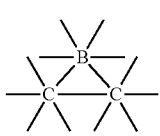

(2)

According to the non-aqueous electrolytic solution or the secondary battery of the embodiment of the present application, because the non-aqueous electrolytic solution includes the above-described boron compound, superior battery characteristics are achieved. Also, according to the battery pack, the electric vehicle, the electric power storage system, the electric power tool, or the electronic apparatus of the embodiment of the present application, a similar effect is achieved.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
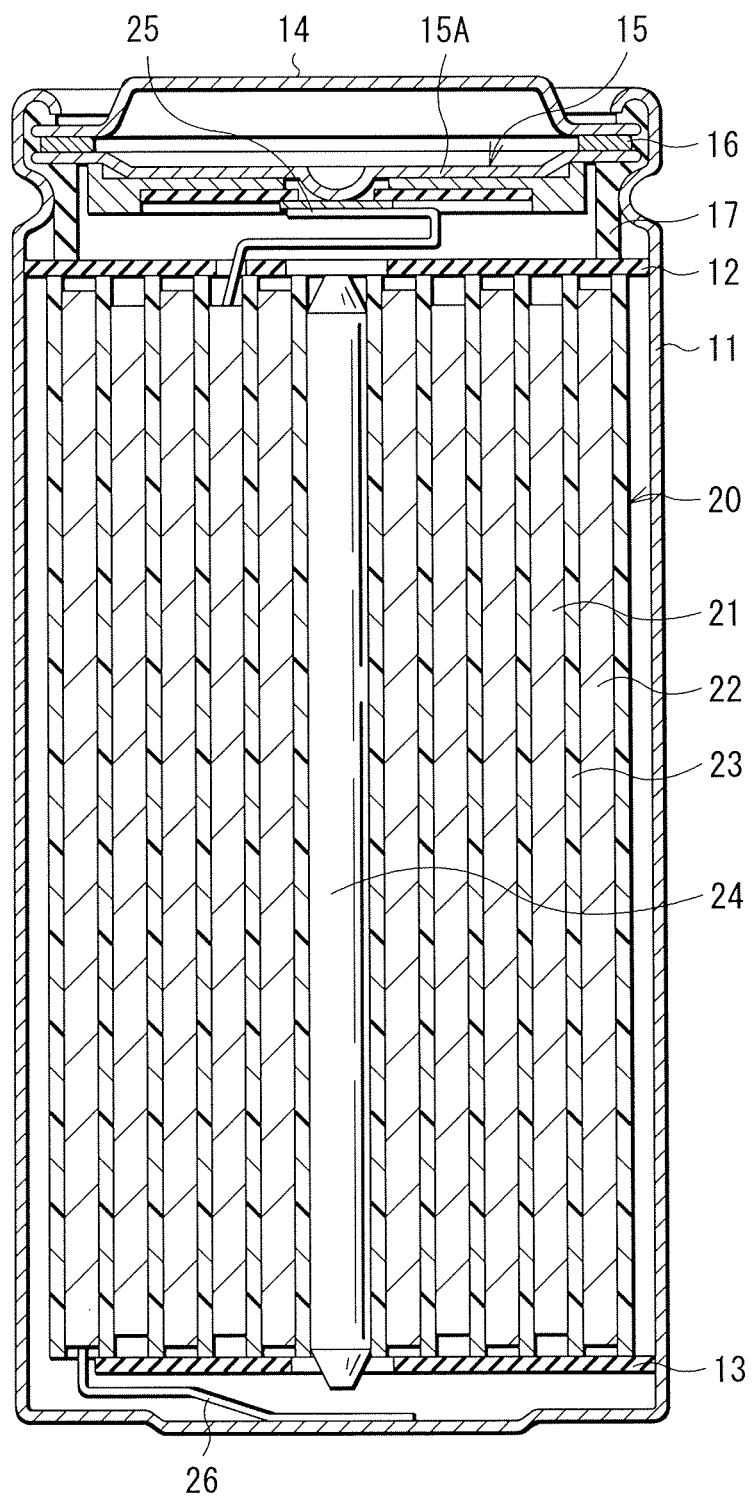
FIG. 1 is a cross-sectional view illustrating a configuration of a secondary battery (of a cylindrical type) of an embodiment of the present application.

Some embodiments of the present application are described below in detail with reference to the drawings. The description is provided in the following order.
1. Non-aqueous Electrolytic Solution
2. Secondary Battery
   2-1. Lithium Ion Secondary Battery
      2-1-1. Cylindrical Type
      2-1-2. Laminated Film Type
   2-2. Lithium Metal Secondary Battery
3. Applications of Secondary Battery
   3-1. Battery Pack (Single Battery)
   3-2. Battery Pack (Assembled Battery)
   3-3. Electric Vehicle
   3-4. Electric Power Storage System
   3-5. Electric Power Tool
[1. Non-aqueous Electrolytic Solution]

First, description is provided of non-aqueous electrolytic solution of an embodiment of the present application (hereinafter, may be simply referred to as "electrolytic solution").

The electrolytic solution described herein may be used, for example, in a lithium secondary battery. However, a kind of secondary battery in which the electrolytic solution is used is not limited to the lithium secondary battery.

[Boron Compound]

The electrolytic solution includes one or more of boron compounds that satisfy two conditions described below.

As a first condition, the boron compound includes six or more boron atoms. In other words, the number of boron atoms included in a chemical formula of the boron compound is six or larger. Accordingly, compounds represented by respective chemical formulas of $BH_3$, $B_2H_6$, etc. are not encompassed by the boron compound described herein.

As a second condition, the boron compound includes one or both of an octavalent boron-hydrogen-containing structure (BH-containing structure) represented by Formula (1) and a dodecavalent boron-carbon-containing structure (BC-containing structure) represented by Formula (2). In other words, the boron compound may include only the BH-containing structure, may include only the BC-containing structure, or may include both of the BH-containing structure and the BC-containing structure. Further, the number of the BH-containing structure included in the boron compound is not limited to one and may be two or larger. This is similarly applicable to the number of the BC-containing structure included in the boron compound.

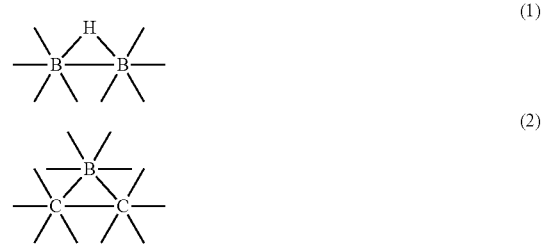

The kind of the boron compound is not particularly limited as long as the boron compound is a compound that satisfies the two conditions described above. It is to be noted that the boron compound may include one or more of other elements (additional elements) in addition to the above-mentioned constituent elements, i.e., boron, hydrogen (H), and carbon (C). A kind of the additional element is not particularly limited.

One reason why the electrolytic solution includes the boron compound is because chemical stability of the electrolytic solution is improved thereby compared to in a case where the electrolytic solution includes no boron compound. As a result, a decomposition reaction of the electrolytic solution at the time of charge and discharge reactions is suppressed, and discharge capacity is therefore less likely to be decreased even after the charge and discharge reactions.

Specifically, the boron compound may include, for example, one or more of compounds represented by respective Formulas (3) to (6).

(x is an integer from 6 to 18 both inclusive, and y is an integer from 10 to 22 both inclusive.)

(Each of R1s is one of a hydrogen group, a halogen group, a monovalent hydrocarbon group, a monovalent halogenated hydrocarbon group, and a monovalent group obtained by bonding two or more thereof.)

($M1^+$ is one of a monovalent metal cation of a metal element belonging to Group 1 in long form of periodic table and a monovalent non-metal cation represented by $NR3_4^+$. Each of R2s and R3s is one of a hydrogen group, a halogen group, a monovalent hydrocarbon group, a monovalent halogenated hydrocarbon group, and a monovalent group obtained by bonding two or more thereof.)

($M2^+$ is one of a monovalent metal cation of a metal element belonging to Group 1 in the long form of periodic table and a monovalent non-metal cation represented by $NR5_4^+$. M3 is a divalent metal element belonging to Groups 2 to 16 in the long form of periodic table. Each of R4s and R5s is one of a hydrogen group, a halogen group, a monovalent hydrocarbon group, a monovalent halogenated hydrocarbon group, and a monovalent group obtained by bonding two or more thereof.)

The boron compound (hereinafter, referred to as "first boron compound") represented by Formula (3) is a compound that includes boron and hydrogen as constituent elements, and includes the BH-containing structure. A value of x that represents the number of boron atoms is not particularly limited as long as the value of x is an integer that satisfies the condition described above. This is similarly applicable to a value of y that represents the number of hydrogen atoms. In particular, y may preferably satisfy y=x+4, because this allows easier synthesis of the first boron compound.

Specific examples of the first boron compound may include $B_6H_{10}$, $B_{10}H_{14}$, and $B_{18}H_{22}$; however, the first boron compound may be other compound.

The boron compound (hereinafter, referred to as "second boron compound") represented by Formula (4) is a compound that includes boron and hydrogen as constituent elements, includes a particular group (R1), and also includes the BC-containing structure.

A kind of each of R1s is not particularly limited as long as the kind thereof is one of a hydrogen group, a halogen group, a monovalent hydrocarbon group, a monovalent halogenated hydrocarbon group, and a monovalent group obtained by bonding two or more thereof. The plurality of R1s may be groups of the same kind, or may be groups of different kinds. It goes without saying that only part of the plurality of R1s may be groups of the same kind.

The halogen group may be, for example, one of a fluorine group (—F), a chlorine group (—Cl), a bromine group (—Br), and an iodine group (—I).

The monovalent hydrocarbon group is a collective term of monovalent groups that include carbon and hydrogen as constituent elements. The monovalent hydrocarbon group may be linear, or may be branched to include one or more side chains. Further, the monovalent hydrocarbon group may be a saturated hydrocarbon group that includes no carbon-carbon multiple bond, or may be an unsaturated hydrocarbon group that includes one or more carbon-carbon multiple bonds. The one or more carbon-carbon multiple bonds may be one or more carbon-carbon double bonds (>C=C<), one or more carbon-carbon triple bonds (—C≡C—), or both.

Specifically, the monovalent hydrocarbon group may be, for example, one of an alkyl group, an alkenyl group, an alkynyl group, a cycloalkyl group, an aryl group, and a monovalent group obtained by bonding two or more thereof.

Carbon number of the monovalent hydrocarbon group is not particularly limited. In particular, carbon number of the alkyl group may be preferably from 1 to 8 both inclusive, and carbon number of each of the alkenyl group and the alkynyl group may be preferably from 2 to 8 both inclusive. Carbon number of the cycloalkyl group may be preferably from 3 to 18 both inclusive, and carbon number of the aryl group may be preferably from 6 to 18 both inclusive. One reason for this is because solubility, compatibility, etc. of the second boron compound are secured thereby.

Specific examples of the alkyl group may include a methyl group (—$CH_3$), an ethyl group (—$C_2H_5$), a propyl group (—$C_3H_7$), an n-butyl group (—$C_4H_9$), and a t-butyl group (—C($CH_3$)$_2$—$CH_3$). Specific examples of the alkenyl group may include a vinyl group (—CH=$CH_2$) and an allyl group (—$CH_2$—CH=$CH_2$). Specific examples of the alkynyl group may include an ethynyl group (—C≡CH).

Specific examples of the cycloalkyl group may include a cyclopropyl group, a cyclobutyl group, a cyclopentyl group, a cyclohexyl group, a cycloheptyl group, and a cyclooctyl group. Specific examples of the aryl group may include a phenyl group and a naphthyl group.

The monovalent halogenated hydrocarbon group is a group obtained by substituting one or more halogen groups for one or more hydrogen groups in the above-described monovalent hydrocarbon group. Details of the halogen group are as described above. It is to be noted that, when the monovalent halogenated hydrocarbon group includes a plurality of halogen groups, the plurality of halogen groups may be groups of the same kind, or may be groups of different kinds. It goes without saying that only part of the plurality of halogen groups may be groups of the same kind.

Specific examples of a halogenated alkyl group may include a perfluoromethyl group (—$CF_3$), a perfluoroethyl (—$C_2F_5$), and a perfluoropropyl group (—$C_3F_7$). Specific examples of a halogenated alkenyl group may include a perfluorovinyl group (—CF=$CF_2$). Specific examples of a halogenated alkynyl group may include a perfluoroethynyl group (—C≡CF). Specific examples of a halogenated cycloalkyl group may include a perfluorocyclopropyl group. Specific examples of a halogenated aryl group may include a perfluorophenyl group.

The monovalent group obtained by bonding two or more of the above-described groups is a group (hereinafter, referred to as "bond group") obtained by bonding two or more of the hydrogen group, the halogen group, the monovalent hydrocarbon group, and the monovalent halogenated hydrocarbon group described above to achieve a monovalent group as a whole. Examples of the bond group may include a group obtained by bonding an alkyl group and an alkenyl group, a group obtained by bonding an alkyl group and an alkynyl group, a group obtained by bonding an alkenyl group and an alkynyl group, a group obtained by an alkyl group and an aryl group, a group obtained by bonding an alkyl group and a cycloalkyl group, and a group obtained by bonding a halogenated alkyl group and an alkyl group.

In particular, the monovalent hydrocarbon group may be preferably an alkyl group, and the monovalent halogenated hydrocarbon group may be preferably a halogenated alkyl group, because it is thereby easier to secure solubility, compatibility, etc. of the second boron compound.

Specific examples of the second boron compound may include $C_2B_{10}H_{12}$, $C_2B_{10}H_{11}CH_3$, and $C_2B_{10}H_{11}C_6H_5$; however, the second boron compound may be other compound.

The boron compound (hereinafter, referred to as "third boron compound") represented by Formula (5) is a compound that includes a cation ($M1^+$) and an anion ($[C_2B_9R2_{12}]^-$). The anion includes boron and hydrogen as constituent elements, and includes a particular group (R2). Also, the anion includes the BH-containing structure and the BC-containing structure.

A kind of the cation is not particularly limited as long as the kind thereof is one of a monovalent metal cation and a monovalent non-metal cation. Details of R2 are similar to the details of R1 described above.

The monovalent metal cation is a monovalent ion of a metal element that belongs to Group 1 in the long form of periodic table. Examples of the metal cation may include a lithium ion ($Li^+$), a sodium ion ($Na^+$), a potassium ion ($K^+$), a rubidium ion ($Rb^+$), and a cesium ion ($Cs^+$); however, the metal cation may be other monovalent ion.

The non-metal cation is a monovalent ion represented by $NR3_4^+$. Details of R3 are similar to the details of R1 described above. Examples of the non-metal cation may include an ammonium ion ($NH_4^+$), a trimethylammonium ion (($CH_3)_3NH^+$), a triethylammonium ion (($C_2H_5)_3NH^+$), a tripropylammonium ion (($C_3H_7)_3NH^+$), a tributylammonium ion (($C_4H_9)_3NH^+$), a tetramethylammonium ion (($CH_3)_4N^+$), a tetraethylammonium ion (($C_2H_5)_4N^+$), and a tetrabutylammonium ion (($C_4H_9)_4N^+$).

Specific examples of the third boron compound may include $Li[C_2B_9H_{12}]$, $Cs[C_2B_9H_{12}]$, and $(C_2H_5)_3NH[C_2B_9H_{12}]$; however, the third boron compound may be other compound.

The boron compound (hereinafter, referred to as "fourth boron compound") represented by Formula (6) is a compound that includes a cation ($M2^+$) and an anion ($[M3(C_2B_9R4_{12})_2]^-$). The anion includes boron, hydrogen, and a divalent metal element (M3) as constituent elements, and includes a particular group (R4). Also, the anion includes the BC-containing structure.

Details of M2 are similar to the details of M1 described above. Details of each of R4 and R5 are similar to the details of R1 described above.

A kind of M3 is not particularly limited as long as the kind thereof is one of divalent metal elements that belong to Groups 2 to 16 in the long form of periodic table. Examples of the divalent metal element may include cobalt (Co) and nickel (Ni); however, the divalent metal element may be other divalent metal element.

Specific examples of the fourth boron compound may include $Cs[Co(C_2B_9H_{12})_2]$, $K[Co(C_2B_9H_{12})_2]$, $(C_4H_9)_4N[Co(C_2B_9H_{12})_2]$, $(CH_3)_3NH[Co(C_2B_9H_{12})_2]$, and $(C_2H_5)_3NH[Co(C_2B_9H_{12})_2]$; however, the fourth boron compound may be other compound.

Hereinafter, the first boron compound, the second boron compound, the third boron compound, and the fourth boron compound described above may be also collectively and simply referred to as "boron compound".

A content of the boron compound in the electrolytic solution is not particularly limited. However, the content thereof may be preferably from about 0.01 wt % to about 1.5 wt % both inclusive, because the decomposition reaction of the electrolytic solution is suppressed thereby while high battery capacity is maintained.

It is to be noted that the electrolytic solution may include one or more of other materials in addition to the above-described boron compound.

[Other Material: Solvent]

Other material may be, for example, one or more of solvents such as non-aqueous solvents.

Examples of the solvent may include cyclic ester carbonate, chain ester carbonate, lactone, chain carboxylic ester, and nitrile, because superior solubility, compatibility, etc. are achieved thereby. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methyl propyl carbonate. Examples of the lactone may include γ-butyrolactone and γ-valerolactone. Examples of the chain carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

Moreover, examples of the solvent may include 1,2-dimethoxyethane, tetrahydrofuran, 2-methyhetrahydrofuran, tetrahydropyran, 1,3-dioxolane, 4-methyl-1,3-dioxolane, 1,3-dioxane, 1,4-dioxane, N,N-dimethylformamide, N-methylpyrrolidone, N-methyloxazolidinone, N,N'-dimethylimidazolidinone, nitromethane, nitroethane, sulfolane, trimethyl phosphate, and dimethylsulfoxide, because a similar advantage is achieved thereby.

In particular, one or more of ethylene carbonate, propylene carbonate, dimethyl carbonate, diethyl carbonate, and ethyl methyl carbonate may be preferable. In this case, a combination of a high viscosity (high dielectric constant) solvent (for example, specific dielectric constant $ε≥30$) such as ethylene carbonate or propylene carbonate and a low viscosity solvent (for example, viscosity$≤1$ mPa·s) such as dimethyl carbonate, ethyl methyl carbonate, or diethyl carbonate may be more preferable. One reason for this is because dissociation characteristics of the electrolyte salt and ion mobility are thereby improved in the electrolytic solution.

Other than this, the solvent may be one or more of unsaturated cyclic ester carbonates, because a stable protective film is thereby formed on the surface of the electrode at the time of charge and discharge operations, and the decomposition reaction of the electrolytic solution is therefore suppressed.

The unsaturated cyclic ester carbonate is a cyclic ester carbonate that includes one or more unsaturated bonds (carbon-carbon double bonds). More specifically, the unsaturated cyclic ester carbonate may be one or more of compounds represented by respective Formulas (3) to (5). A content of the unsaturated cyclic ester carbonate in the solvent is not particularly limited, but may be from about 0.01 wt % to about 10 wt % both inclusive, for example.

(3)

(4)

(5)

(Each of R21 and R22 is one of a hydrogen group and an alkyl group. Each of R23 to R26 is one of a hydrogen group, an alkyl group, a vinyl group, and an allyl group, and at least one of R23 to R26 is one of the vinyl group and the allyl group. R27 is a group represented by >CR28R29, and each of R28 and R29 is one of a hydrogen group and an alkyl group.)

The compound represented by Formula (3) is a vinylene-carbonate-based compound. R21 and R22 may be groups of the same kind, or may be groups of different kinds Details of the alkyl group are as described above. Specific examples of the vinylene-carbonate-based compound may include vinylene carbonate (1,3-dioxole-2-one), methyl vinylene carbonate (4-methyl-1,3-dioxole-2-one), ethyl vinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. In particular, vinylene carbonate may be preferable, because vinylene carbonate is easily available, and achieves a high effect.

The compound represented by Formula (4) is a vinyl-ethylene-carbonate-based compound. R23 to R26 may be groups of the same kind, or may be groups of different kinds. It goes without saying that part of R23 to R26 may be groups of the same kind. Specific examples of the vinyl-ethylene-carbonate-based compound may include vinyl-ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. In particular, vinyl ethylene carbonate may be preferable, because vinyl ethylene carbonate is easily available, and achieves a high effect. It goes without saying that as R23 to R26, all of them may be vinyl groups, all of them may be allyl groups, or the vinyl group and the allyl group may coexist.

The compound represented by Formula (5) is a methylene-ethylene-carbonate-based compound. R28 and R29 may be groups of the same kind, or may be groups of different kinds. Specific examples of the methylene-ethylene-carbonate-based compound may include methylene ethylene carbonate (4-methylene-1,3-dioxolane-2-one), 4,4-dimehyl-5-methylene-1,3-dioxolane-2-one, and 4,4-diethyl-5-methylene-1,3-dioxolane-2-one. The methylene-ethylene-carbonate-based compound may be a compound that includes two methylene groups, other than a compound that includes one methylene group as represented by Formula (18).

Other than above, the unsaturated cyclic ester carbonate may be, for example, catechol carbonate that has a benzene ring, or the like.

Moreover, the solvent may be one or more of halogenated ester carbonates, because a stable protective film is thereby formed on the surface of the electrode at the time of charge and discharge operations, and the decomposition reaction of the electrolytic solution is therefore suppressed. The halogenated ester carbonate is an ester carbonate that includes one or more halogens as constituent elements. More specifically, the halogenated ester carbonate may be one or more of compounds represented by respective Formulas (6) and (7). A content of the halogenated ester carbonate in the solvent is not particularly limited, but may be from about 0.01 wt % to about 50 wt % both inclusive, for example.

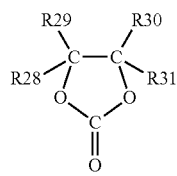

(6)

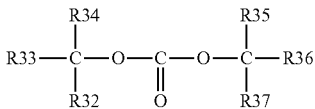

(7)

(Each of R28 to R31 is one of a hydrogen group, a halogen group, an alkyl group, and a halogenated alkyl group, and at least one of R28 to R31 is one of the halogen group and the halogenated alkyl group. Each of R32 to R37 is one of a hydrogen group, a halogen group, an alkyl group, and a halogenated alkyl group, and at least one of R32 to R37 is one of the halogen group and the halogenated alkyl group.)

The compound represented by Formula (6) is a cyclic halogenated ester carbonate. R28 to R31 may be groups of the same kind, or may be groups of different kinds. It goes without saying that part of R28 to R31 may be groups of the same kind.

A kind of the halogen group is not particularly limited. However, in particular, the halogen group may be preferably one or more of a fluorine group (—F), a chlorine group (—Cl), a bromine group (—Br), and an iodine group (—I). The fluorine group may be more preferable, because the fluorine group allows easier formation of the above-described protective film compared to other halogen groups. It is to be noted that the number of halogen groups may be preferably two than one, and may be three or more. One reason for this is because ability of forming the protective film is increased thereby, which results in a more rigid protective film.

Details of the alkyl group are as described above. The halogenated alkyl group is a group obtained by substituting one or more halogen groups (halogenating) for one or more hydrogen groups in the alkyl group. Details of the halogen group are as described above.

Specific examples of the cyclic halogenated ester carbonate may include compounds represented by respective Formulas (6-1) to (6-21) including geometric isomers. In particular, 4-fluoro-1,3-dioxolane-2-one represented by Formula (6-1), 4,5-difluoro-1,3-dioxolane-2-one represented by Formula (6-3), or the like may be preferable. It is to be noted that, as 4,5-difluoro-1,3-dioxolane-2-one, a trans-isomer may be more preferable than a cis-isomer, because the trans-isomer thereof is easily available and achieves a high effect.

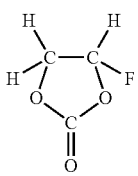

(6-1)

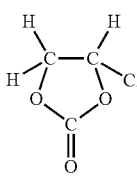

(6-2)

(6-3)
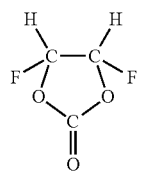
(6-4)
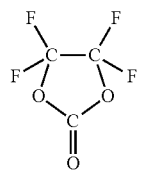
(6-5)
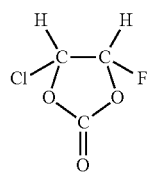
(6-6)
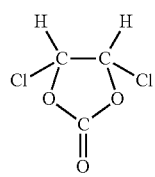
(6-7)
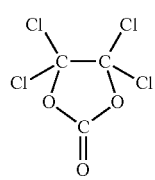
(6-8)
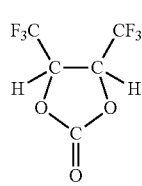
(6-9)
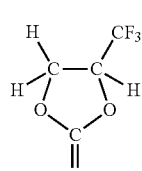
(6-10)
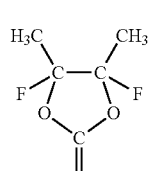
(6-11)
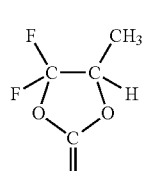
(6-12)
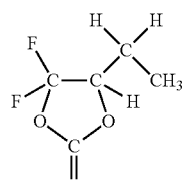
(6-13)
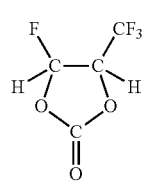
(6-14)
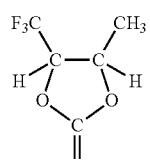
(6-15)
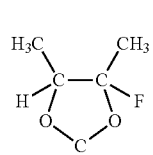
(6-16)
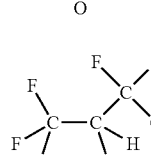
(6-17)
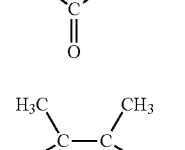
(6-18)
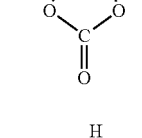
(6-19)
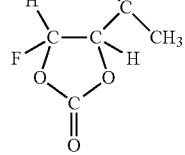

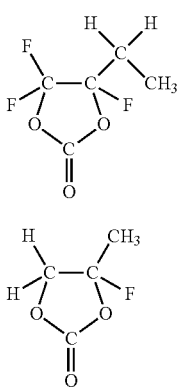

(6-20)

(6-21)

The compound represented by Formula (7) is a chain halogenated ester carbonate. R32 to R37 may be groups of the same kind, or may be groups of different kinds. It goes without saying that part of R32 to R37 may be groups of the same kind.

Specific examples of the chain halogenated ester carbonate may include fluoromethylmethyl carbonate, bis(fluoromethyl) carbonate, and difluoromethyl methyl carbonate.

Moreover, the solvent may be ester sulfonate, because chemical stability of the electrolytic solution is further improved thereby. The ester sulfonate may include ester monosulfonate and ester disulfonate.

The ester monosulfonate may be cyclic ester monosulfonate, or may be chain ester monosulfonate. Examples of the cyclic ester monosulfonate may include sultone such as propane sultone and propene sultone. The chain ester monosulfonate is ester monosulfonate obtained by cutting cyclic ester monosulfonate in mid-course thereof. To give an example, the chain ester monosulfonate in a case of cutting propane sultone in mid-course thereof may be $CH_3$—$CH_2$—$CH_2$—$SO_3$—$CH_3$, etc. A direction of —$SO_3$—(—$S(=O)_2$—O—) is not particularly limited. Specifically, $CH_3$—$CH_2$—$CH_2$—$SO_3$—$CH_3$ described above may be $CH_3$—$CH_2$—$CH_2$—$S(=O)_2$—O—$CH_3$, or may be $CH_3$—$CH_2$—$CH_2$—O—$S(=O)_2$—$CH_3$.

The ester disulfonate may be cyclic ester disulfonate, or may be chain ester disulfonate. Examples of the cyclic ester disulfonate may include compounds represented by respective Formulas (8-1) to (8-3). The chain ester disulfonate is ester disulfonate obtained by cutting cyclic ester disulfonate in mid-course thereof. To give an example, the chain ester disulfonate in a case of cutting the compound represented by Formula (8-2) may be $CH_3$—$SO_3$—$CH_2$—$CH_2$—$SO_3$—$CH_3$, etc. Directions of two —$SO_3$—(—$S(=O)_2$—O—) are not particularly limited. Specifically, $CH_3$—$SO_3$—$CH_2$—$CH_2$—$SO_3$—$CH_3$ described above may be $CH_3$—$S(=O)_2$—O—$CH_2$—$CH_2$—$S(=O)_2$—O—$CH_3$, may be $CH_3$—O—$S(=O)_2$—$CH_2$—$CH_2$—$S(=O)_2$—O—$CH_3$, or may be $CH_3$—$S(=O)_2$—O—$CH_2$—$CH_2$—O—$S(=O)_2$—$CH_3$.

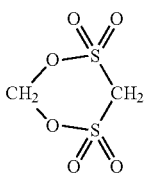

(8-1)

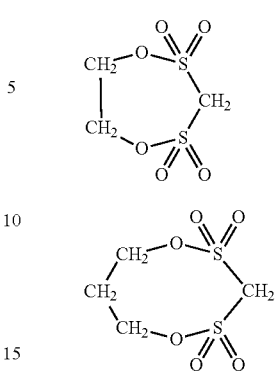

(8-2)

(8-3)

A content of the ester sulfonate in the solvent is not particularly limited, but may be from about 0.5 wt % to about 5 wt % both inclusive, for example.

Moreover, the solvent may be acid anhydride, because chemical stability of the electrolytic solution is further improved thereby. Examples of the acid anhydride may include carboxylic anhydride, disulfonic anhydride, and carboxylic sulfonic anhydride. Examples of the carboxylic anhydride may include succinic anhydride, glutaric anhydride, and maleic anhydride. Examples of the disulfonic anhydride may include ethane disulfonic anhydride and propane disulfonic anhydride. Examples of the carboxylic sulfonic anhydride may include sulfobenzoic anhydride, sulfopropionic anhydride, and sulfobutyric anhydride. A content of the acid anhydride in the solvent is not particularly limited, but may be from about 0.5 wt % to about 5 wt % both inclusive, for example.

Moreover, the solvent may be a dicyano compound or a diisocyanate compound, because chemical stability of the electrolytic solution is further improved thereby. The dicyano compound may be, for example, a compound represented by NC—$C_mH_{2m}$—CN where m is an integer of 1 or larger. More specifically, the dicyano compound may be NC—$C_2H_4$—CN, etc. The diisocyanate compound may be, for example, a compound represented by OCN—$C_nH_{2n}$—NCO where n is an integer of 1 or larger. More specifically, the diisocyanate compound may be OCN—$C_6H_{12}$—NCO, etc. A content of the dicyano compound in the solvent is not particularly limited, but may be from about 0.5 wt % to about 5 wt % both inclusive, for example. This range of content may be similarly applicable to the diisocyanate compound, for example.

[Other Material: Electrolyte Salt]

Moreover, other material may be, for example, one or more of electrolyte salts such as a lithium salt. It is to be noted that the electrolyte salt may include, for example, a salt other than the lithium salt. Examples of the salt other than the lithium salt may include a salt of light metal other than lithium.

Examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr).

In particular, one or more of $LiPF_6$, $LiBF_4$, $LiClO_4$, and $LiAsF_6$ may be preferable, and $LiPF_6$ may be more preferable, because internal resistance is lowered thereby.

Other than above, the electrolyte salt may be one or more of compounds represented by respective Formulas (9) to (11). It is to be noted that R41 and R43 may be groups of the same kind, or may be groups of different kinds. This is similarly applicable also to R51 to R53, and to R61 and R62.

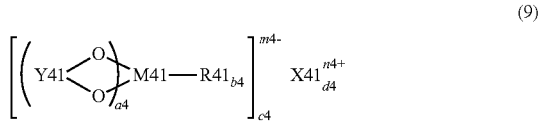

(9)

(X41 is one of Group 1 elements and Group 2 elements in the long form of periodic table, and Al. M41 is one of transition metal, Group 13 elements, Group 14 elements, and Group 15 elements in the long form of periodic table. R41 is a halogen group. Y41 is one of —C(=O)—R42-C(=O)—, —C(=O)—CR43$_2$-, and —C(=O)—C(=O)—. R42 is one of an alkylene group, a halogenated alkylene group, an arylene group, and a halogenated arylene group. R43 is one of an alkyl group, a halogenated alkyl group, an aryl group, and a halogenated aryl group. a4 is an integer from 1 to 4 both inclusive. b4 is an integer of one of 0, 2, and 4. Each of c4, d4, m4, and n4 is an integer from 1 to 3 both inclusive.)

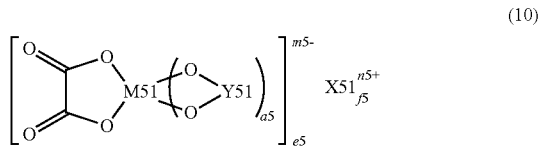

(10)

(X51 is one of Group 1 elements and Group 2 elements in the long form of periodic table. M51 is one of transition metal, Group 13 elements, Group 14 elements, and Group 15 elements in the long form of periodic table. Y51 is one of —C(=O)—(CR51$_2$)$_{b5}$-C(=O)—, —R53$_2$C—(CR52$_2$)$_{c5}$-C(=O)—, —R53$_2$C—(CR52$_2$)$_{c5}$-CR53$_2$-, —R53$_2$C—(CR52$_2$)$_{c5}$-S(=O)$_2$—, —S(=O)$_2$—(CR52$_2$)$_{d5}$-S(=O)$_2$—, and —C(=O)—(CR52$_2$)$_{d5}$-S(=O)$_2$—. Each of R51 and R53 is one of a hydrogen group, an alkyl group, a halogen group, and a halogenated alkyl group. At least one R51 is one of the halogen group and the halogenated alkyl group. At least one R53 is one of the halogen group and the halogenated alkyl group. R52 is one of a hydrogen group, an alkyl group, a halogen group, and a halogenated alkyl group. Each of a5, e5, and n5 is an integer of one of 1 and 2. Each of b5 and d5 is an integer from 1 to 4 both inclusive. c5 is an integer from 0 to 4 both inclusive. Each of f5 and m5 is an integer from 1 to 3 both inclusive.)

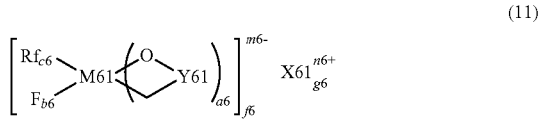

(11)

(X61 is one of Group 1 elements and Group 2 elements in the long form of periodic table. M61 is one of transition metal, Group 13 elements, Group 14 elements, and Group 15 elements in the long form of the periodic table. Rf is one of a fluorinated alkyl group and a fluorinated aryl group that have carbon number from 1 to 10 both inclusive. Y61 is one of —C(=O)—(CR61$_2$)$_{d6}$-C(=O)—, —R62$_2$C—(CR61$_2$)$_{d6}$-C(=O)—, —R62$_2$C—(CR61$_2$)$_{d6}$-CR62$_2$-, —R62$_2$C—(CR61$_2$)$_{d6}$-S(=O)$_2$—, —S(=O)$_2$—(CR61$_2$)$_{e6}$-S(=O)$_2$—, and —C(=O)—(CR61$_2$)$_{e6}$-S(=O)$_2$—. R61 is one of a hydrogen group, an alkyl group, a halogen group, and a halogenated alkyl group. R62 is one of a hydrogen group, an alkyl group, a halogen group, and a halogenated alkyl group. At least one R62 is one of the halogen group and the halogenated alkyl group. Each of a6, f6, and n6 is an integer of one of 1 and 2. Each of b6, c6, and e6 is an integer from 1 to 4 both inclusive. d6 is an integer from 0 to 4 both inclusive. Each of g6 and m6 is an integer from 1 to 3 both inclusive.)

It is to be noted that Group 1 elements are hydrogen (H), lithium (Li), sodium (Na), potassium (K), rubidium (Rb), cesium (Cs), and francium (Fr). Group 2 elements are beryllium (Be), magnesium (Mg), calcium (Ca), strontium (Sr), barium (Ba), and radium (Ra). Group 13 elements are boron (B), aluminum (Al), gallium (Ga), indium (In), and thallium (Tl). Group 14 elements are carbon (C), silicon (Si), germanium (Ge), tin (Sn), and lead (Pb). Group 15 elements are nitrogen (N), phosphorous (P), arsenic (As), antimony (Sb), and bismuth (Bi).

Specific examples of the compound represented by Formula (9) may include compounds represented by respective Formulas (9-1) to (9-6). Specific examples of the compound represented by Formula (10) may include compounds represented by respective Formulas (10-1) to (10-8). Specific examples of the compound represented by Formula (11) may include a compound represented by Formula (11-1). However, specific examples of the compounds represented by respective Formulas (9) to (11) may include other compounds.

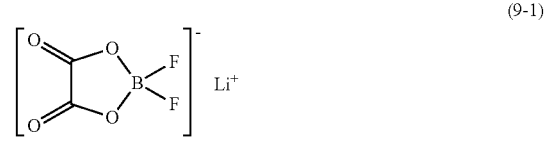

(9-1)

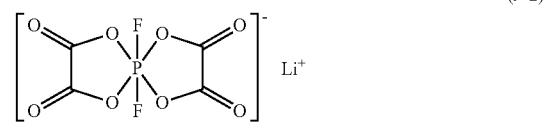

(9-2)

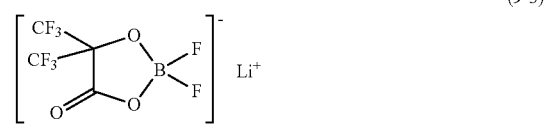

(9-3)

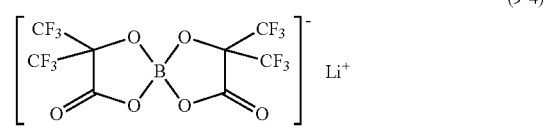

(9-4)

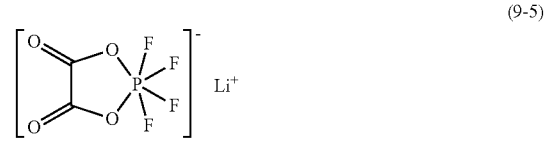

(9-5)

-continued (9-6) 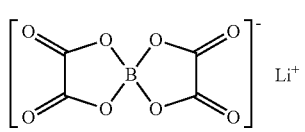

(10-1) 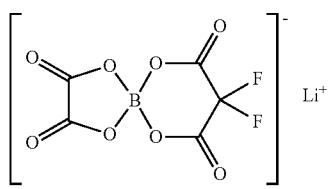

(10-2) 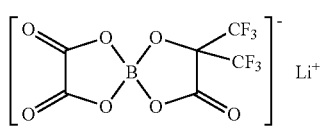

(10-3) 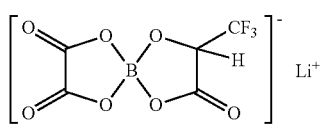

(10-4) 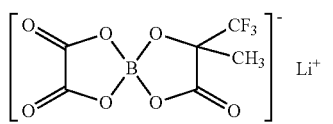

(10-5) 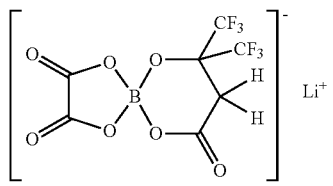

(10-6) 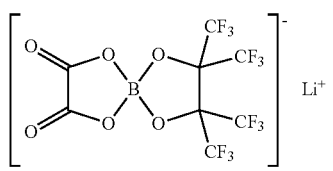

(10-7) 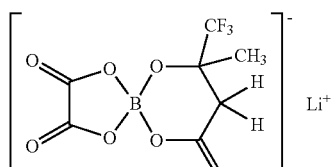

(10-8) 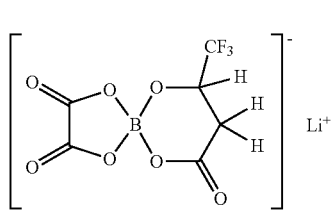

-continued

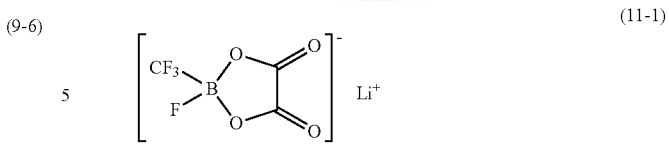
(11-1)

Moreover, the electrolyte salt may be one or more of compounds represented by respective Formulas (12) to (14). It is to be noted that m and n may be the same value, or may be different values. This is similarly applicable also to p, q, and r.

$$LiN(C_mF_{2m+1}SO_2)(C_nF_{2n+1}SO_2) \quad (12)$$

(Each of m and n is an integer of 1 or larger.)

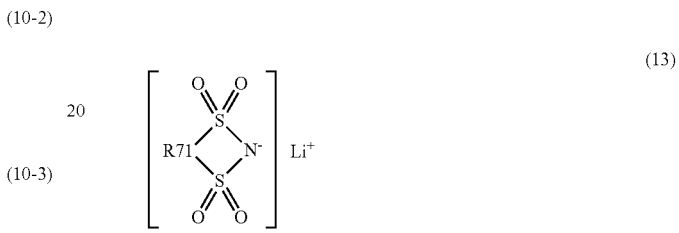
(13)

(R71 is a linear or branched perfluoroalkylene group having carbon number from 2 to 4 both inclusive.)

$$LiC(C_pF_{2p+1}SO_2)(C_qF_{2q+1}SO_2)(CrF_{2r+1}SO_2) \quad (14)$$

(Each of p, q, and r is an integer of 1 or larger.)

The compound represented by Formula (12) is a chain imide compound. Specific examples of the chain imide compound may include bis(fluorosulfonyl) imide lithium ($LiN(SO_2F)_2$), bis(trifluoromethanesulfonyl) imide lithium ($LiN(CF_3SO_2)_2$), bis(pentafluoroethanesulfonyl) imide lithium ($LiN(C_2F_5SO_2)_2$), (trifluoromethanesulfonyl) (pentafluoroethanesulfonyl) imide lithium ($LiN(CF_3SO_2)(C_2F_5SO_2)$), (trifluoromethanesulfonyl) (heptafluoropropanesulfonyl) imide lithium ($LiN(CF_3SO_2)(C_3F_7SO_2)$), and (trifluoromethanesulfonyl) (nonafluorobuthanesulfonyl) imide lithium ($LiN(CF_3SO_2)(C_4F_9SO_2)$). However, specific examples of the chain imide compound may include other compounds.

The compound represented by Formula (13) is a cyclic imide compound. Specific examples of the cyclic imide compound may include compounds represented by respective Formulas (13-1) to (13-4). However, specific examples of the cyclic imide compound may include other compounds.

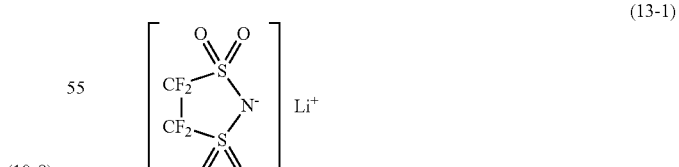
(13-1)

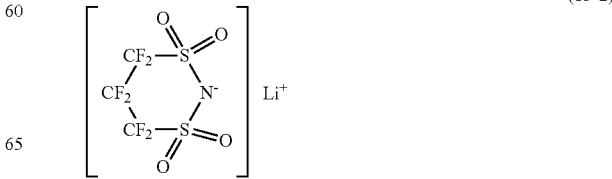
(13-2)

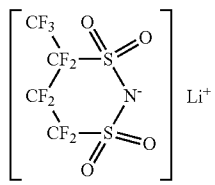

(13-3)

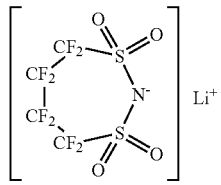

(13-4)

The compound represented by Formula (14) is a chain methide compound. Specific examples of the chain methide compound may include lithium tris(trifluoromethanesulfonyl) methide (LiC(CF$_3$SO$_2$)$_3$). However, specific examples of the chain methide compound may include other compounds.

A content of the electrolyte salt is not particularly limited. However, in particular, the content thereof may be preferably from about 0.3 mol/kg to about 3.0 mol/kg both inclusive with respect to the solvent, because high ion conductivity is achieved thereby.

[Other Material: Other Additive]

Moreover, other material may be one or more of materials other than the materials described above. Examples of such an additive may include a phosphorous-fluorine-containing salt such as LiPF$_2$O$_2$ and Li$_2$PFO$_3$. A content of the additive in the electrolytic solution is not particularly limited.

[Functions and Effects of Electrolytic Solution]

According to the electrolytic solution, the above-described boron compound is included. In this case, as described above, chemical stability of the electrolytic solution is improved, and the decomposition reaction of the electrolytic solution is therefore suppressed at the time of the charge and discharge reactions. This allows discharge capacity to be less likely to be decreased even after the charge and discharge reactions, which achieves superior battery characteristics.

In particular, when the boron compound includes one or more of the compounds represented by respective Formulas (3) to (6), a higher effect is achieved. Also, when the content of the boron compound in the electrolytic solution is from about 0.01 wt % to about 1.5 wt % both inclusive, a higher effect is achieved.

[2. Secondary Battery]

Next, a secondary battery that uses the above-described electrolytic solution is described.

[2-1. Lithium Ion Secondary Battery]

The secondary battery described below may be, for example, a lithium secondary battery (lithium ion secondary battery) in which capacity of an anode 22 is obtained by insertion and extraction of lithium (lithium ion) that is an electrode reactant.

[2-1-1. Cylindrical Type]

Figure 2:
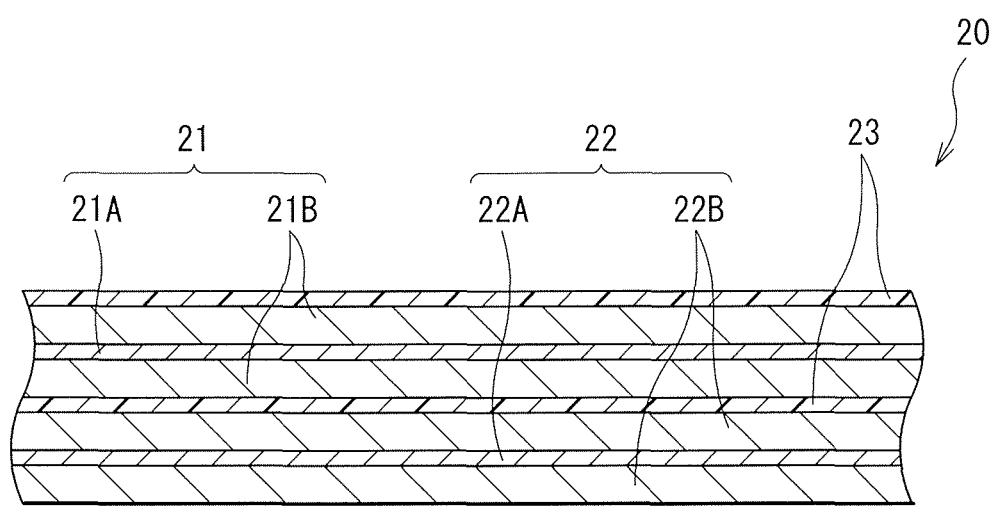
FIG. 2 is a cross-sectional view illustrating an enlarged part of a spirally wound electrode body illustrated in FIG. 1.

FIG. 1 and FIG. 2 each illustrate a cross-sectional configuration of a secondary battery of an embodiment of the present application. FIG. 2 illustrates an enlarged part of a spirally wound electrode body 20 illustrated in FIG. 1.

[General Configuration of Secondary Battery]

The secondary battery may be, for example, a secondary battery of a so-called cylindrical type. The secondary battery may contain a pair of insulating plates 12 and 13 and a spirally wound electrode body 20 inside a battery can 11 in the shape of an almost-hollow cylinder. In the spirally wound electrode body 20, for example, a cathode 21 and the anode 22 are laminated with a separator 23 in between and are spirally wound.

The battery can 11 may have a hollow structure in which one end of the battery can 11 is closed and the other end of the battery can 11 is opened. The battery can 11 may be made, for example, of one or more of iron (Fe), aluminum (Al), alloy thereof or the like. The surface of the battery can 11 may be plated with nickel (Ni) or the like. The pair of insulating plates 12 and 13 is arranged to sandwich the spirally wound electrode body 20 in between, and to extend perpendicularly to the spirally wound periphery surface of the spirally wound electrode body 20.

At the open end of the battery can 11, a battery cover 14, a safety valve mechanism 15, and a positive temperature coefficient device (PTC device) 16 are attached by being swaged with a gasket 17. Thereby, the battery can 11 is hermetically sealed. The battery cover 14 may be made, for example, of a material similar to that of the battery can 11. The safety valve mechanism 15 and the PTC device 16 are provided inside the battery cover 14. The safety valve mechanism 15 is electrically connected to the battery cover 14 via the PTC device 16. In the safety valve mechanism 15, in the case where the internal pressure becomes a certain level or higher by internal short circuit, external heating, or the like, a disk plate 15A inverts to cut electric connection between the battery cover 14 and the spirally wound electrode body 20. In order to prevent abnormal heat generation resulting from a large current, resistance of the PTC device 16 is increased in accordance with increase in temperature. The gasket 17 may be made, for example, of an insulating material. The surface of the gasket 17 may be coated with asphalt.

In the center of the spirally wound electrode body 20, for example, a center pin 24 may be inserted. However, the center pin 24 may not be inserted in the center of the spirally wound electrode body 20. For example, a cathode lead 25 made of a conductive material such as aluminum may be connected to the cathode 21. For example, an anode lead 26 made of a conductive material such as nickel may be connected to the anode 22. For example, the cathode lead 25 may be attached to the safety valve mechanism 15 by welding or the like, and may be electrically connected to the battery cover 14. For example, the anode lead 26 may be attached to the battery can 11 by welding or the like, and may be electrically connected to the battery can 11.

[Cathode]

The cathode 21 has a cathode active material layer 21B on a single surface or both surfaces of a cathode current collector 21A. The cathode current collector 21A may be made, for example, of a conductive material such as aluminum, nickel, or stainless steel.

The cathode active material layer 21B contains, as a cathode active material, one or more of cathode materials capable of inserting and extracting lithium. It is to be noted that the cathode active material layer 21B may further contain one or more of other materials such as a cathode binder and a cathode electric conductor.

The cathode material may be preferably a lithium-containing compound. More specifically, the cathode material may be preferably a lithium-containing composite oxide, a lithium-containing phosphate compound, or both, because high energy density is achieved thereby.

"Lithium-containing composite oxide" is an oxide that includes lithium and one or more elements (hereinafter, may be referred to as "other element(s)" which excludes lithium (Li)) as constituent elements, and has a bedded-salt-type crystal structure or a spinel-type crystal structure. "Lithium-containing phosphate compound" is a phosphate compound that includes lithium and one or more other elements as constituent elements, and has an olivine-type crystal structure.

Kinds of one or more other elements are not particularly limited as long as the kinds thereof are one or more of arbitrary elements. In particular, the one or more other elements may be preferably one or more of elements belonging to Groups 2 to 15 in the long form of periodic table. More specifically, one or more other elements may be preferably one or more metal elements selected from nickel (Ni), cobalt (Co), manganese (Mn), and iron (Fe), because a high voltage is achieved thereby.

In particular, the lithium-containing composite oxide having a bedded-salt-type crystal structure may be preferably one or more of compounds represented by respective Formulas (21) to (23).

$$Li_aMn_{(1-b-c)}Ni_bM11_cO_{(2-d)}Fe \quad (21)$$

(M11 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). a to e satisfy $0.8 \le a \le 1.2$, $0 < b < 0.5$, $0 \le c \le 0.5$, $(b+c) < 1$, $-0.1 \le d \le 0.2$, and $0 \le e \le 0.1$. A composition of lithium is different depending on a charge-discharge state of the secondary battery, and a is a value in a completely-discharged state.)

$$Li_aNi_{(1-b)}M12_bO_{(2-c)}F_d \quad (22)$$

(M12 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.8 \le a \le 1.2$, $0.005 \le b \le 0.5$, $-0.1 \le c \le 0.2$, and $0 \le d \le 0.1$. A composition of lithium is different depending on a charge-discharge state of the secondary battery, and a is a value in a completely-discharged state.)

$$Li_aCo_{(1-b)}M13_bO_{(2-c)}F_d \quad (23)$$

(M13 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.8 \le a \le 1.2$, $0 \le b < 0.5$, $-0.1 \le c \le 0.2$, and $0 \le d \le 0.1$. A composition of lithium is different depending on a charge-discharge state of the secondary battery, and a is a value in a completely-discharged state.)

Specific examples of the lithium-containing composite oxide having a bedded-salt-type crystal structure may include LiNiO$_2$, LiCoO$_2$, LiCo$_{0.98}$Al$_{0.01}$Mg$_{0.01}$O$_2$, LiNi$_{0.5}$CO$_{0.2}$Mn$_{0.3}$O$_2$, LiNi$_{0.8}$Co$_{0.15}$Al$_{0.05}$O$_2$, LiNi$_{0.33}$Co$_{0.33}$Mn$_{0.33}$O$_2$, Li$_{1.2}$Mn$_{0.52}$Co$_{0.175}$Ni$_{0.1}$O$_2$, and Li$_{1.15}$(Mn$_{0.65}$Ni$_{0.22}$Co$_{0.13}$)O$_2$.

The lithium-containing composite oxide having a spinel-type crystal structure may be preferably one or more of compounds represented by Formula (24).

$$Li_aMn_{(2-b)}M14_bO_cF_d \quad (24)$$

(M14 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.9 \le a \le 1.1$, $0 \le b \le 0.6$, $3.7 \le c \le 4.1$, and $0 \le d \le 0.1$. A composition of lithium is different depending on a charge-discharge state of the secondary battery, and a is a value in a completely-discharged state.)

Specific examples of the lithium-containing composite oxide having a spinel-type crystal structure may include LiMn$_2$O$_4$.

The lithium-containing phosphate compound having an olivine-type crystal structure may be preferably one or more of compounds represented by Formula (25).

$$Li_aM15PO_4 \quad (25)$$

(M15 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). a satisfies $0.9 \le a \le 1.1$. A composition of lithium is different depending on a charge-discharge state of the secondary battery, and a is a value in a completely-discharged state.)

Specific examples of the lithium-containing phosphate compound having an olivine-type crystal structure may include LiFePO$_4$, LiMnPO$_4$, LiFe$_{0.5}$Mn$_{0.5}$PO$_4$, and LiFe$_{0.3}$Mn$_{0.7}$PO$_4$.

It is to be noted that the lithium-containing composite oxide may be one or more of compounds represented by Formula (26).

$$(Li_2MnO_3)_x(LiMnO_2)_{1-x} \quad (26)$$

(x satisfies $0 \le x \le 1$. A composition of lithium is different depending on a charge-discharge state of the secondary battery, and x is a value in a completely-discharged state.)

Other than the above-described materials, the cathode material may be, for example, one or more of an oxide, a disulfide, a chalcogenide, a conductive polymer, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene. However, the cathode material may be a material other than the above-mentioned materials.

The cathode binder may include, for example, one or more of synthetic rubbers, polymer materials, and the like. Examples of the synthetic rubber may include styrene-butadiene-based rubber, fluorine-based rubber, and ethylene propylene diene. Examples of the polymer material may include polyvinylidene fluoride and polyimide.

The cathode electric conductor may include, for example, one or more of carbon materials and the like. Examples of the carbon material may include graphite, carbon black, acetylene black, and Ketjen black. The cathode electric conductor may be a metal material, a conductive polymer, or the like as long as the material has electric conductivity.

[Anode]

The anode 22 has an anode active material layer 22B on a single surface or both surfaces of an anode current collector 22A.

The anode current collector 22A may be formed, for example, of a conductive material such as copper, nickel, and stainless steel. The surface of the anode current collector 22A may be preferably roughened, because, due to a so-called anchor effect, close-attachment characteristics of the anode active material layer 22B with respect to the anode current collector 22A are improved thereby. In this case, it is enough that the surface of the anode current collector 22A in a region opposed to the anode active material layer 22B is roughened at minimum. Examples of a roughening method may include a method of forming fine particles by utilizing an electrolytic treatment. The electrolytic treatment is a method of forming the fine particles on the surface of the anode current collector 22A with the use of an electrolytic method in an electrolytic bath to provide concavities and convexities on the surface of the anode current collector 22A. A copper foil fabricated by an electrolytic method is generally called an electrolytic copper foil.

The anode active material layer 22B contains one or more of anode materials capable of inserting and extracting the electrode reactant as anode active materials. However, the anode active material layer 22B may further contain one or more of other materials such as an anode binder and an anode electric conductor. The details of the anode binder and the anode electric conductor may be, for example, similar to the details of the cathode binder and the cathode electric conductor.

However, the chargeable capacity of the anode material may be preferably larger than the discharge capacity of the cathode 21 in order to prevent the electrode reactant from being unintentionally precipitated on the anode 22 in the middle of a charge operation. That is, the electrochemical equivalent of the anode material capable of inserting and extracting the electrode reactant may be preferably larger than the electrochemical equivalent of the cathode 21. It is to be noted that the electrode reactant precipitated on the anode 22 may be, for example, lithium metal when the electrode reactant is lithium.

The anode material may be, for example, one or more of carbon materials, because, in the carbon material, its crystal structure change at the time of insertion and extraction of the electrode reactant is extremely small, and high energy density is stably achieved. Further, the carbon material serves as an anode electric conductor as well, which improves electrical conductivity of the anode active material layer 22B.

Examples of the carbon material may include graphitizable carbon, non-graphitizable carbon, and graphite. However, the spacing of (002) plane in the non-graphitizable carbon may be preferably equal to or greater than 0.37 nm, and the spacing of (002) plane in graphite may be preferably equal to or smaller than 0.34 nm. More specifically, examples of the carbon material may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as phenol resin and furan resin at appropriate temperature. In addition thereto, the carbon material may be low crystalline carbon heat-treated at temperature of about 1000 deg C. or lower, or may be amorphous carbon. It is to be noted that the shape of the carbon material may be any of a fibrous shape, a spherical shape, a granular shape, and a scale-like shape.

Moreover, the anode material may be, for example, a material (metal-based material) containing one or more of metal elements and metalloid elements as constituent elements, because high energy density is thereby achieved.

The metal-based material may be a simple substance, alloy, or a compound, may be two or more thereof or may be a material that has one or more phases thereof in part or all thereof "Alloy" includes a material containing one or more metal elements and one or more metalloid elements, in addition to a material configured of two or more metal elements. Further, "alloy" may contain a non-metal element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include one or more of metal elements and metalloid elements capable of forming alloy with the electrode reactant. Specific examples thereof may include magnesium, boron, aluminum, gallium, indium (In), silicon, germanium (Ge), tin, lead (Pb), bismuth (Bi), cadmium (Cd), silver (Ag), zinc, hafnium (Hf), zirconium, yttrium (Y), palladium (Pd), and platinum (Pt).

In particular, silicon, tin, or both may be preferable, because silicon and tin have superior ability of inserting and extracting the electrode reactant, and therefore achieve extremely-high energy density.

A material containing silicon, tin, or both as constituent elements may be any of a simple substance, alloy, and a compound of silicon, may be any of a simple substance, alloy, and a compound of tin, may be two or more thereof, or may be a material that has one or more phases thereof in part or all thereof. It is to be noted that "simple substance" merely refers to a simple substance in a general sense (a small amount of impurity may be therein contained), and does not necessarily refer to a purity 100% simple substance.

The alloy of silicon may contain, for example, one or more of elements such as tin, nickel, copper, iron, cobalt, manganese, zinc, indium, silver, titanium, germanium, bismuth, antimony, and chromium, as constituent elements other than silicon. The compound of silicon may contain, for example, one or more of carbon, oxygen, and the like as constituent elements other than silicon. It is to be noted that the compound of silicon may contain, for example, one or more of the series of elements described for the alloy of silicon, as constituent elements other than silicon.

Specific examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\le2$), and $LiSiO$. v in $SiO_v$ may be in a range of $0.2<v<1.4$.

The alloy of tin may contain, for example, one or more of elements such as silicon, nickel, copper, iron, cobalt, manganese, zinc, indium, silver, titanium, germanium, bismuth, antimony, and chromium, as constituent elements other than tin. The compound of tin may contain, for example, one or more of elements such as carbon and oxygen as constituent elements other than tin. It is to be noted that the compound of tin may contain, for example, one or more of the series of elements described for the alloy of tin, as constituent elements other than tin.

Specific examples of the alloy of tin and the compound of tin may include $SnO_w$ ($0<w\le2$), $SnSiO_3$, $LiSnO$, and $Mg_2Sn$.

In particular, the material containing tin as a constituent element may be preferably, for example, a material (Sn-containing material) containing a second constituent element and a third constituent element in addition to tin (first constituent element). Examples of the second constituent element may include one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. Examples of the third constituent element may include one or more of elements such as boron, carbon, aluminum, and phosphorus (P). One reason for this is because high battery capacity, superior cycle characteristics, and the like are achieved when the Sn-containing material contains the second and third constituent elements.

In particular, the Sn-containing material may be preferably a material (SnCoC-containing material) containing tin, cobalt, and carbon as constituent elements. In the SnCoC-containing material, for example, the content of carbon may be from about 9.9 mass % to about 29.7 mass % both inclusive, and the ratio of contents of tin and cobalt (Co/(Sn+Co)) may be from about 20 mass % to about 70 mass % both inclusive, because high energy density is achieved thereby.

The SnCoC-containing material may preferably have a phase containing tin, cobalt, and carbon. Such a phase may be preferably low crystalline or amorphous. The phase is a reaction phase capable of reacting with the electrode reactant. Therefore, due to existence of the reaction phase, further superior characteristics are achieved. A half bandwidth (diffraction angle 2θ) of a diffraction peak obtained by X-ray diffraction of the reaction phase may be preferably equal to or larger than 1 deg in a case where CuKα ray is used as a specific X ray, and the insertion rate is 1 deg/min. One reason for this is because the electrode reactant is more smoothly inserted and extracted thereby, and reactivity with the electrolytic solution is decreased. It is to be noted that, in some cases, the SnCoC-containing material may include a phase containing a simple substance or part of the respective constituent elements in addition to the low-crystalline phase or the amorphous phase.

Whether or not the diffraction peak obtained by the X-ray diffraction corresponds to the reaction phase capable of reacting with the electrode reactant is allowed to be easily determined by comparison between X-ray diffraction charts before and after electrochemical reaction with the electrode reactant. For example, if the position of the diffraction peak after electrochemical reaction with the electrode reactant is changed from the position of the diffraction peak before the electrochemical reaction with the electrode reactant, the obtained diffraction peak corresponds to the reaction phase capable of reacting with the electrode reactant. In this case, for example, the diffraction peak of the low-crystalline reaction phase or the amorphous reaction phase is seen in a range of 2θ=from about 20 deg to about 50 deg both inclusive. Such a reaction phase may include, for example, the foregoing respective constituent elements, and it may be considered that the low-crystalline or amorphous structure thereof may result mainly from the existence of carbon.

In the SnCoC-containing material, part or all of carbon as a constituent element may be preferably bonded to a metal element or a metalloid element as other constituent element, because cohesion or crystallization of tin and/or the like is suppressed thereby. The bonding state of elements is allowed to be checked, for example, by X-ray photoelectron spectroscopy (XPS). In a commercially-available device, for example, Al-Kα ray, Mg-Kα ray, or the like may be used as a soft X ray. In the case where part or all of carbons are bonded to a metal element, a metalloid element, or the like, the peak of a synthetic wave of 1s orbit of carbon (C1s) appears in a region lower than 284.5 eV. It is to be noted that energy calibration is made so that the peak of 4f orbit (Au4f) of gold atom is obtained in 84.0 eV. At this time, in general, because surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made with the use of commercially-available software to isolate both peaks from each other. In the waveform analysis, the position of the main peak existing on the lowest bound energy side is considered the energy standard (284.8 eV).

The SnCoC-containing material is not limited to the material (SnCoC) configured of only tin, cobalt, and carbon as constituent elements. The SnCoC-containing material may further contain, for example, one or more of silicon, iron, nickel, chromium, indium, niobium, germanium, titanium, molybdenum, aluminum, phosphorus, gallium, bismuth, and the like as constituent elements, in addition to tin, cobalt, and carbon.

Other than the SnCoC-containing material, a material (SnCoFeC-containing material) containing tin, cobalt, iron, and carbon as constituent elements may be also preferable. The composition of the SnCoFeC-containing material may be arbitrary. To give an example, when the content of iron is set smaller, the content of carbon may be from about 9.9 mass % to about 29.7 mass % both inclusive, the content of iron may be from about 0.3 mass % to about 5.9 mass % both inclusive, and the ratio of contents of tin and cobalt (Co/(Sn+Co)) may be from about 30 mass % to about 70 mass % both inclusive. Alternatively, when the content of iron is set larger, the content of carbon may be from about 11.9 mass % to about 29.7 mass % both inclusive, the ratio of contents of tin, cobalt, iron ((Co+Fe)/(Sn+Co+Fe)) may be from about 26.4 mass % to about 48.5 mass % both inclusive, and the ratio of contents of cobalt and iron (Co/(Co+Fe)) may be from about 9.9 mass % to about 79.5 mass % both inclusive. One reason for this is because, in such a composition range, high energy density is achieved. The physical characteristics (such as a half bandwidth) of the SnCoFeC-containing material are similar to those of the SnCoC-containing material described above.

Other than the above-mentioned materials, the anode material may be, for example, one or more of metal oxide, a polymer compound, and the like. Examples of the metal oxide may include iron oxide, ruthenium oxide, and molybdenum oxide. Examples of the polymer compound may include polyacetylene, polyaniline, and polypyrrole.

In particular, the anode material may preferably include both of the carbon material and the metal-based material for the following reason.

The metal-based material, in particular, the material that includes one or both of silicon and tin as constituent elements has a concern that such a material is easily and radically expanded or contracted upon an electrode reaction, whereas such a material has an advantage of high theoretical capacity. On the other hand, the carbon material has an advantage that the carbon material is difficult to be expanded or contracted upon an electrode reaction, whereas the carbon material has a concern of low theoretical capacity. For this reason, by using both of the carbon material and the metal-based material, expansion and contraction upon an electrode reaction are suppressed while achieving high theoretical capacity (in other words, battery capacity).

The anode active material layer 22B may be formed, for example, by one or more of a coating method, a vapor-phase deposition method, a liquid-phase deposition method, a spraying method, and a firing method (sintering method).

The coating method may be a method in which, for example, after a particulate (powder) anode active material is mixed with an anode binder and/or the like, the mixture is dispersed in a solvent such as an organic solvent, and the anode current collector 22A is coated with the resultant. Examples of the vapor-phase deposition method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method may include an electrolytic plating method and an electroless plating method. The spraying method is a method in which an anode active material in a fused state or a semi-fused state is sprayed to the anode current collector 22A. The firing method may be, for example, a method in which after the anode current collector 22A is coated with the mixture dispersed in the solvent by a coating method, heat treatment is performed at temperature higher than the melting point of the anode binder and/or the like. Examples of the firing method may include an atmosphere firing method, a reactive firing method, and a hot press firing method.

In the secondary battery, as described above, in order to prevent the electrode reactant from being unintentionally precipitated on the anode 22 in the middle of the charge operation, the electrochemical equivalent of the anode material capable of inserting and extracting the electrode reactant may be preferably larger than the electrochemical equivalent of the cathode. Further, in a case where the open circuit voltage (that is, a battery voltage) at the time of completely-charged state is equal to or higher than 4.25 V, the extraction amount of the electrode reactant per unit mass is larger than that in the case where the open circuit voltage is 4.20 V even if the same cathode active material is used. Therefore, amounts of the cathode active material and the anode active material are adjusted accordingly. Thereby, high energy density is achievable.

[Separator]

The separator 23 separates the cathode 21 from the anode 22, and passes lithium ions while preventing current short circuit resulting from contact of both electrodes. The separator 23 may be, for example, a porous film made of synthetic resin, ceramics, or the like. The separator 23 may be a laminated film in which two or more porous films are laminated. Examples of the synthetic resin may include polytetrafluoroethylene, polypropylene, and polyethylene.

In particular, the separator 23 may include, for example, the above-described porous film (base material layer), and a polymer compound layer provided on one surface or both surfaces of the base material layer. One reason for this is because, thereby, close attachment characteristics of the separator 23 with respect to the cathode 21 and the anode 22 are improved, and, skewness of the spirally wound electrode body 20 is therefore suppressed. Thereby, a decomposition reaction of the electrolytic solution is suppressed, and liquid leakage of the electrolytic solution with which the base material layer is impregnated is suppressed. Accordingly, even if charge and discharge operations are performed repeatedly, the resistance is less likely to be increased, and battery swollenness is suppressed.

The polymer compound layer may contain, for example, a polymer material such as polyvinylidene fluoride, because such a polymer material has superior physical strength and is electrochemically stable. However, the polymer material may be a material other than polyvinylidene fluoride. In a case where the polymer compound layer is formed, for example, after solution in which the polymer material is dissolved is applied onto the base material layer, the base material is subsequently dried. Alternatively, the base material layer may be soaked in the solution and may be subsequently dried.

[Electrolytic Solution]

The spirally wound electrode body 20 is impregnated with electrolytic solution as a liquid electrolyte. A configuration of this electrolytic solution is similar to the configuration of the electrolytic solution of an embodiment of the present application.

[Operation of Secondary Battery]

The secondary battery may operate, for example, as follows.

At the time of a charge operation, lithium ions extracted from the cathode 21 may be inserted in the anode 22 through the electrolytic solution. On the other hand, at the time of a discharge operation, lithium ions extracted from the anode 22 may be inserted in the cathode 21 through the electrolytic solution.

[Method of Manufacturing Secondary Battery]

The secondary battery may be manufactured, for example, by the following procedure.

When fabricating the cathode 21, first, the cathode active material may be mixed with the cathode binder, the cathode electric conductor, and/or the like as necessary to obtain a cathode mixture. Subsequently, the cathode mixture is dispersed in an organic solvent or the like to obtain paste cathode mixture slurry. Subsequently, both surfaces of the cathode current collector 21A are coated with the cathode mixture slurry, which is dried to form the cathode active material layers 21B. Subsequently, the cathode active material layers 21B may be compression-molded with the use of a roll pressing machine and/or the like while heating the cathode material layers 21B as necessary. In this case, compression-molding may be repeated several times.

When fabricating the anode 22, the anode active material layers 22B are formed on the anode current collector 22A by a procedure similar to that of the cathode 21 described above. Specifically, the anode active material is mixed with the anode binder, the anode electric conductor, and/or the like to prepare an anode mixture, which is subsequently dispersed in an organic solvent or the like to form paste anode mixture slurry. Subsequently, both surfaces of the anode current collector 22A are coated with the anode mixture slurry, which is dried to form the anode active material layers 22B. Lastly, the anode active material layers 22B are compression-molded with the use of a roll pressing machine and/or the like.

When preparing the electrolytic solution, the electrolyte salt is dispersed or dissolved in the solvent, and the boron compound is added to that solvent thereafter.

When assembling the secondary battery using the cathode 21 and the anode 22, the cathode lead 25 is attached to the cathode current collector 21A by a welding method and/or the like, and the anode lead 26 is attached to the anode current collector 22A by a welding method and/or the like. Subsequently, the cathode 21 and the anode 22 are laminated with the separator 23 in between and are spirally wound to fabricate the spirally wound electrode body 20. Thereafter, the center pin 24 is inserted in the center of the spirally wound electrode body 20. Subsequently, the spirally wound electrode body 20 is sandwiched between the pair of insulating plates 12 and 13, and is contained inside the battery can 11. In this case, the end tip of the cathode lead 25 is attached to the safety valve mechanism 15 by a welding method and/or the like, and the end tip of the anode lead 26 is attached to the battery can 11 by a welding method and/or the like. Subsequently, the electrolytic solution is injected into the battery can 11, and the separator 23 is impregnated with the electrolytic solution. Subsequently, at the open end of the battery can 11, the battery cover 14, the safety valve mechanism 15, and the PTC device 16 are fixed by being swaged with the gasket 17.

[Functions and Effects of Secondary Battery]

According to the cylindrical-type lithium ion secondary battery, the electrolytic solution has a configuration similar to the configuration of the electrolytic solution of an embodiment of the present application. Accordingly, the decomposition reaction of the electrolytic solution is suppressed at the time of charge and discharge reactions, and the discharge capacity is therefore less likely to be decreased even after the charge and discharge reactions. As a result, superior battery characteristics are achieved. Functions and effects other than the above are similar to those of the electrolytic solution of an embodiment of the present application.

[2-1-2. Laminated Film Type]

Figure 3:
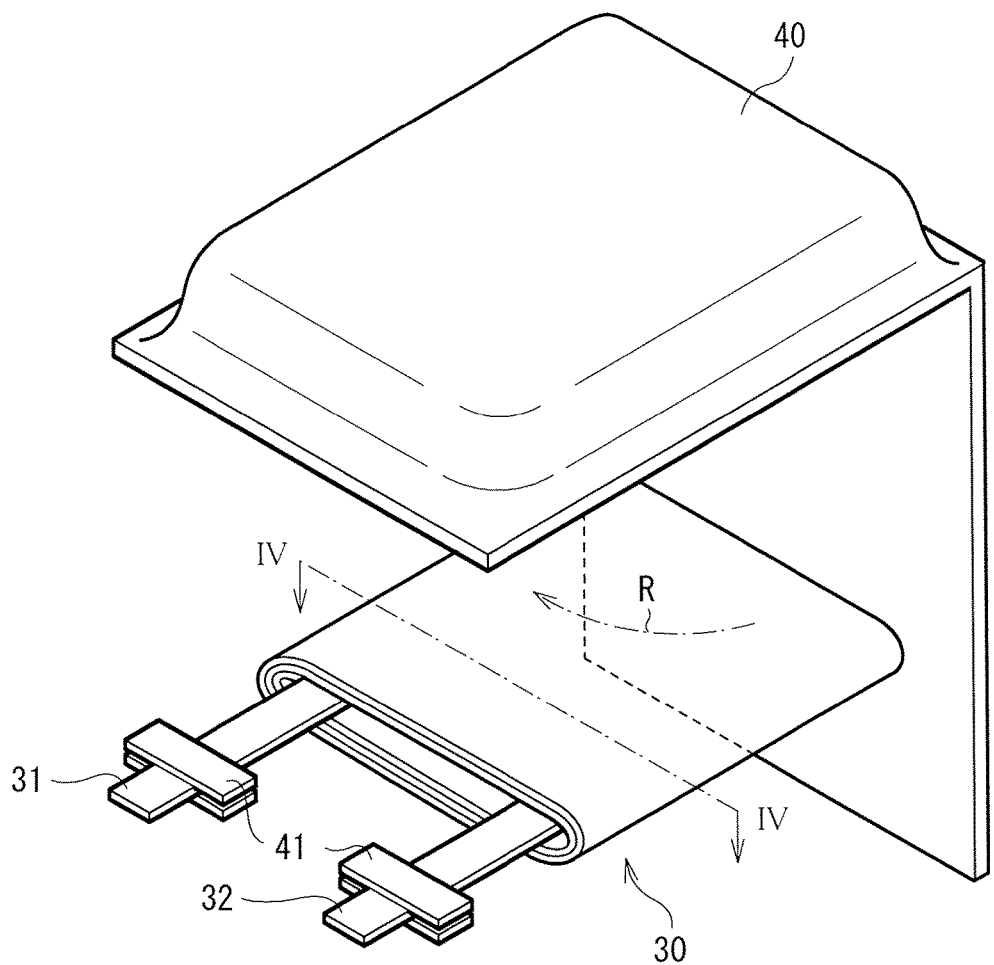
FIG. 3 is a perspective view illustrating a configuration of another secondary battery (of a laminated film type) of an embodiment of the present application.
Figure 4:
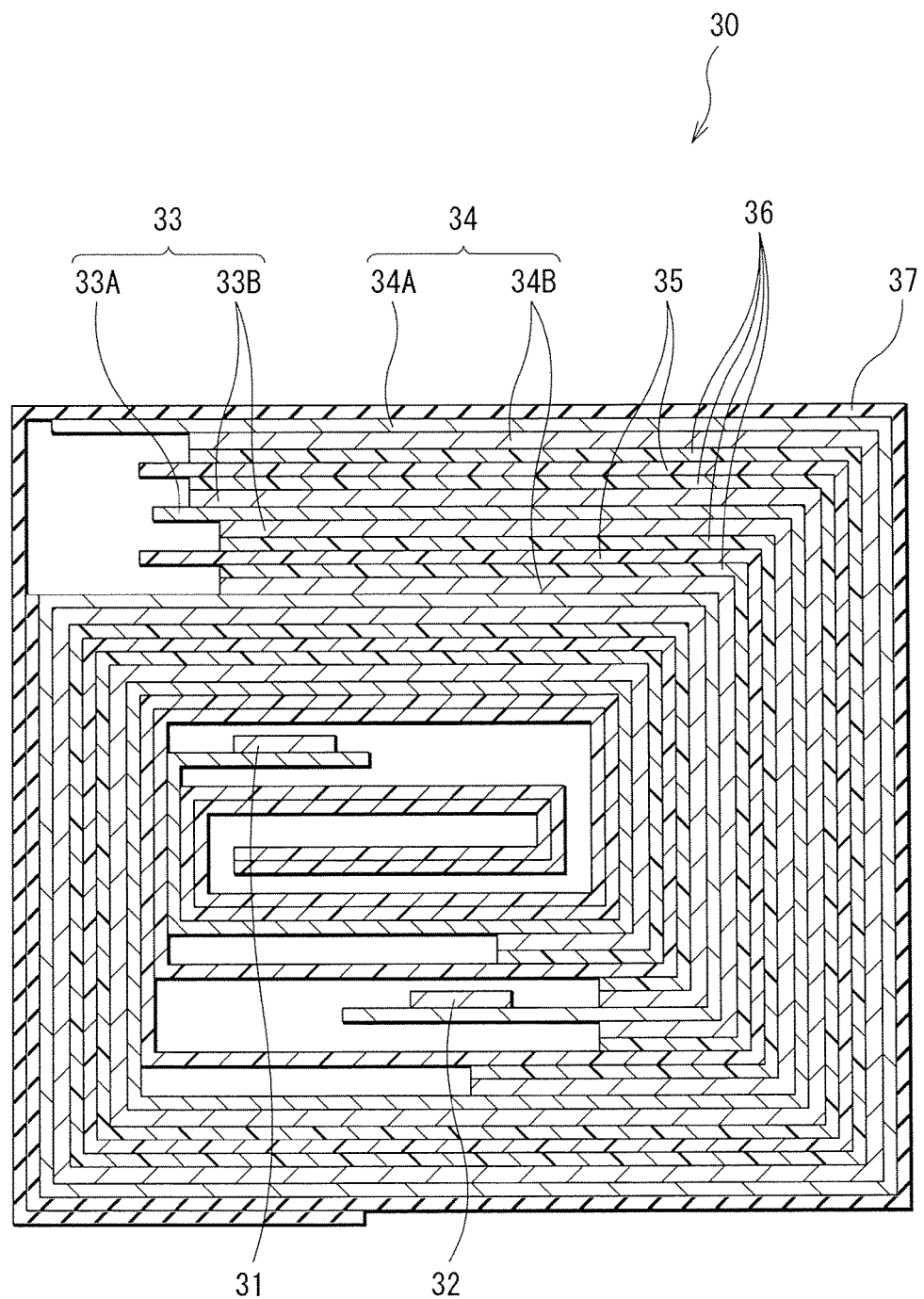
FIG. 4 is a cross-sectional view of a spirally wound electrode body taken along a line IV-IV illustrated in FIG. 3.

FIG. 3 illustrates an exploded perspective configuration of another secondary battery of an embodiment of the present application. FIG. 4 illustrates an enlarged cross-section taken along a line IV-IV of a spirally wound electrode body 30 illustrated in FIG. 3. In the following description, the elements of the cylindrical-type secondary battery described above are used where appropriate.

[General Configuration of Secondary Battery]

The secondary battery described below is a lithium ion secondary battery having a so-called laminated-film-type battery structure.

As illustrated in FIGS. 3 and 4, for example, the secondary battery contains the spirally wound electrode body 30 inside a film-like outer package member 40. In the spirally wound electrode body 30, a cathode 33 and an anode 34 are laminated with a separator 35 and an electrolyte layer 36 in between and are spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be made, for example, of a conductive material such as aluminum, and the anode lead 32 may be made, for example, of a conducive material such as copper, nickel, and stainless steel. These conductive materials may be in the shape of for example, a thin plate or mesh.

The outer package member 40 may be, for example, a film that is foldable in a direction of an arrow R illustrated in FIG. 3. A depression portion for containing the spirally wound electrode body 30 is provided in part of the outer package member 40. The outer package member 40 may be a laminated film in which, for example, a fusion bonding layer, a metal layer, and a surface protective layer are laminated in this order. In a process of manufacturing the secondary battery, the outer package member 40 is folded so that portions of the fusion bonding layer are opposed to each other with the spirally would electrode body 30 in between, and outer peripheries of the portions of the fusion bonding layer are fusion-bonded to each other. However, the outer package member 40 may be two laminated films that are bonded to each other by an adhesive or the like. The fusion bonding layer may be, for example, a film made of one or more of polyethylene, polypropylene, and the like. The metal layer may be, for example, one or more of an aluminum foil and the like. The surface protective layer may be, for example, a film made of one or more of nylon, polyethylene terephthalate, and the like.

In particular, the outer package member 40 may be preferably an aluminum laminated film in which a polyethylene film, an aluminum foil, and a nylon film are laminated in this order. However, the outer package member 40 may be a laminated film having other laminated structure, a polymer film such as polypropylene, or a metal film.

A close-attachment film 41 may be inserted between the outer package member 40 and the cathode lead 31 and between the outer package member 40 and the anode lead 32 in order to prevent outside air intrusion. The close-attachment film 41 is made of a material having close-attachment characteristics with respect to the cathode lead 31 and the anode lead 32. Examples of the material having close-attachment characteristics may include polyolefin resin. More specifically, such a material may be one or more of polyethylene, polypropylene, modified polyethylene, modified polypropylene, and the like, for example.

The cathode 33 may have, for example, a cathode active material layer 33B on one surface or both surfaces of a cathode current collector 33A. The anode 34 may have, for example, an anode active material layer 34B on one surface or both surfaces of an anode current collector 34A. The configurations of the cathode current collector 33A, the cathode active material layer 33B, the anode current collector 34A, and the anode active material layer 34B may be, for example, similar to the configurations of the cathode current collector 21A, the cathode active material layer 21B, the anode current collector 22A, and the anode active material layer 22B, respectively. The configuration of the separator 35 may be, for example, similar to the configuration of the separator 23.

The electrolyte layer 36 includes electrolytic solution and a polymer compound, and the electrolytic solution is held by the polymer compound. The electrolyte layer 36 is a so-called gel electrolyte, because thereby, high ion conductivity (for example, 1 mS/cm or more at room temperature) is obtained and liquid leakage of the electrolytic solution is prevented. The electrolyte layer 36 may further contain other material such as an additive.

The polymer compound may include, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate, and the like. Other than the above, the polymer compound may be a copolymer. The copolymer may be, for example, a copolymer of vinylidene fluoride and hexafluoropropyrene, or the like. In particular, polyvinylidene fluoride may be preferable as a homopolymer, and a copolymer of vinylidene fluoride and hexafluoropropylene may be preferable as a copolymer, because such polymer compounds are electrochemically stable.

For example, the configuration of the electrolytic solution may be similar to the configuration of the electrolytic solution used in the cylindrical-type secondary battery. However, in the electrolyte layer 36 as a gel electrolyte, the solvent of the electrolytic solution refers to a wide concept including not only a liquid material but also a material having ion conductivity capable of dissociating the electrolyte salt. Therefore, in a case where a polymer compound having ion conductivity is used, the polymer compound is also included in the solvent.

It is to be noted that the electrolytic solution may be used as it is instead of the gel electrolyte layer 36. In this case, the spirally wound electrode body 30 is impregnated with the electrolytic solution.

[Operation of Secondary Battery]

The secondary battery may operate, for example, as follows.

At the time of the charge operation, lithium ions extracted from the cathode 33 may be inserted in the anode 34 through the electrolyte layer 36. On the other hand, at the time of the discharge operation, lithium ions extracted from the anode 34 may be inserted in the cathode 33 through the electrolyte layer 36.

[Method of Manufacturing Secondary Battery]

The secondary battery including the gel electrolyte layer 36 may be manufactured, for example, by the following three kinds of procedures.

In the first procedure, the cathode 33 and the anode 34 are fabricated by a fabrication procedure similar to that of the cathode 21 and the anode 22. Specifically, when fabricating the cathode 33, the cathode active material layers 33B are formed on both surfaces of the cathode current collector 33A, and when fabricating the anode 34, the anode active material layers 34B are formed on both surfaces of the anode current collector 34A. Subsequently, electrolytic solution, a polymer compound, a solvent, etc. are mixed to prepare precursor solution. The solvent may be an organic solvent, for example. Thereafter, the cathode 33 and the anode 34 are coated with the precursor solution, which are dried to form the gel electrolyte layer 36. Subsequently, the cathode lead 31 is attached to the cathode current collector 33A by a welding method and/or the like, and the anode lead 32 is attached to the anode current collector 34A by a welding method and/or the like. Subsequently, the cathode 33 and the anode 34 are laminated with the separator 35 in between and are spirally wound to fabricate the spirally wound electrode body 30. Thereafter, the protective tape 37 is adhered to the outermost periphery thereof. Subsequently, after the outer package member 40 is folded so as to sandwich the spirally wound electrode body 30, the outer edges of the outer package member 40 are bonded by a thermal fusion bonding method and/or the like to enclose the spirally wound electrode body 30 into the outer package member 40. In this case, the close-attachment films 41 are inserted between the cathode lead 31 and the outer package member 40 and between the anode lead 32 and the outer package member 40.

In the second procedure, the cathode lead 31 is attached to the cathode 33, and the anode lead 32 is attached to the anode 34. Subsequently, the cathode 33 and the anode 34 are laminated with the separator 35 in between and are spirally wound to fabricate a spirally wound body as a precursor of the spirally wound electrode body 30. Thereafter, the protective tape 37 is adhered to the outermost periphery thereof. Subsequently, after the outer package member 40 is folded so as to sandwich the spirally wound electrode body 30, the outermost peripheries of the outer package member 40 except for one side are bonded by a thermal fusion bonding method and/or the like, and the spirally wound body is contained in the pouch-like outer package member 40. Subsequently, electrolytic solution, monomers as a raw material for the polymer compound, a polymerization initiator, and other materials such as a polymerization inhibitor as necessary are mixed to prepare a composition for electrolyte. Subsequently, the composition for electrolyte is injected inside the pouch-like outer package member 40. Thereafter, the outer package member 40 is hermetically sealed by a thermal fusion bonding method and/or the like. Subsequently, the monomers are thermally polymerized, and thereby, the polymer compound is formed. Thereby, the gel electrolyte layer 36 is formed.

In the third procedure, the spirally wound body is fabricated and contained in the pouch-like outer package member 40 in a manner similar to that of the foregoing second procedure, except that the separator 35 with both surfaces coated with a polymer compound is used. Examples of the polymer compound with which the separator 35 is coated may include a polymer (a homopolymer, a copolymer, or a multicomponent copolymer) containing vinylidene fluoride as a component. Specific examples thereof may include polyvinylidene fluoride, a binary copolymer containing vinylidene fluoride and hexafluoropropylene as components, and a ternary copolymer containing vinylidene fluoride, hexafluoropropylene, and chlorotrifluoroethylene as components. It is to be noted that, together with the polymer containing vinylidene fluoride as a component, other one or more polymer compounds may be used. Subsequently, electrolytic solution is prepared and injected inside the outer package member 40. Thereafter, the opening of the outer package member 40 is hermetically sealed by a thermal fusion bonding method and/or the like. Subsequently, the resultant is heated while a weight is applied to the outer package member 40, and the separator 35 is closely attached to the cathode 33 and the anode 34 with the polymer compound in between. Thereby, the polymer compound is impregnated with the electrolytic solution, the polymer compound is gelated, and accordingly, the electrolyte layer 36 is formed.

In the third procedure, swollenness of the secondary battery is suppressed more than in the first procedure. Further, in the third procedure, the monomer as a raw material of the polymer compound, the solvent, and the like are less likely to be left in the electrolyte layer 36 compared to in the second procedure. Therefore, the formation step of the polymer compound is favorably controlled. Therefore, the cathode 33, the anode 34, and the separator 35 are sufficiently and closely attached to the electrolyte layer 36.

[Functions and Effects of Secondary Battery]

According to the laminated-film-type secondary battery, the electrolytic solution included in the electrolyte layer 36 has a configuration similar to the configuration of the electrolytic solution of an embodiment of the present application, and functions and effects similar to those of the cylindrical-type lithium secondary battery are therefore achieved.

[2-2. Lithium Metal Secondary Battery]

A secondary battery described below is a cylindrical-type lithium secondary battery (lithium metal secondary battery) in which capacity of the anode 22 is represented by precipitation and dissolution of lithium metal. The secondary battery has a configuration similar to the configuration of the lithium ion secondary battery (of a cylindrical type) described above, and is manufactured by similar procedures, except that the anode active material layer 22B is formed of lithium metal.

In this secondary battery, lithium metal is used as the anode active material, which achieves high energy density. The anode active material layer 22B may be present at the time of assembling. However, the anode active material layer 22B may not be present at the time of assembling, and may be formed of lithium metal that is precipitated at the time of the charge operation. Further, the anode active material layer 22B may be utilized as a current collector, and the anode current collector 22A may be omitted.

This secondary battery may operate as follows, for example. At the time of the charge operation, when the lithium ion is extracted from the cathode 21, the extracted lithium ion is precipitated, through the electrolytic solution, as lithium metal on the surface of the anode current collector 22A. At the time of the discharge operation, when lithium metal is dissolved as a lithium ion from the anode active material layer 22B into the electrolytic solution, the dissolved lithium ion is inserted into the cathode 21 through the electrolytic solution.

According to this cylindrical-type lithium metal secondary battery, the electrolytic solution has a configuration similar to the configuration of the electrolytic solution of an embodiment of the present application, and superior battery characteristics are therefore achieved for a reason similar to that for the lithium ion secondary battery.

It is to be noted that the configuration of the lithium metal secondary battery described above is not limited to a cylindrical-type secondary battery, and may be applied to a laminated-film-type secondary battery. Similar effects are achieved also in this case.

[3. Applications of Secondary Battery]

Next, description is provided of application examples of the foregoing secondary battery.

Applications of the secondary battery are not particularly limited as long as the secondary battery is applied to a machine, a device, an instrument, an apparatus, a system (collective entity of a plurality of devices and the like), or the like that is allowed to utilize the secondary battery as a driving electric power source, an electric power storage source for electric power accumulation, or the like. The secondary battery used as an electric power source may be a main electric power source (an electric power source used preferentially), or may be an auxiliary electric power source (an electric power source used instead of a main electric power source or used being switched from the main electric power source). In a case where the secondary battery is used as the auxiliary electric power source, the kind of the main electric power source is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include a mobile lifestyle appliance such as an electric shaver; a storage device such as a backup electric power source and a memory card; an electric power tool such as an electric drill and an electric saw; a battery pack used as an attachable and detachable electric power source of a notebook personal computer or the like; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, etc. One reason for this is because, in these applications, because superior battery characteristics are demanded, performance is effectively improved with the use of the secondary battery according to an embodiment of the present application. It is to be noted that the battery pack is an electric power source using secondary batteries, and is a so-called assembled battery or the like. The electric vehicle is a vehicle that works (runs) with the use of a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, electric power is stored in the secondary battery as an electric power storage source, and therefore, home electric products and the like become usable with the use of the stored electric power. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

Description is specifically provided of some application examples of the secondary battery. It is to be noted that the configurations of the respective application examples described below are mere examples, and may be changed as appropriate.

[3-1. Battery Pack (Single Battery)]

Figure 5:
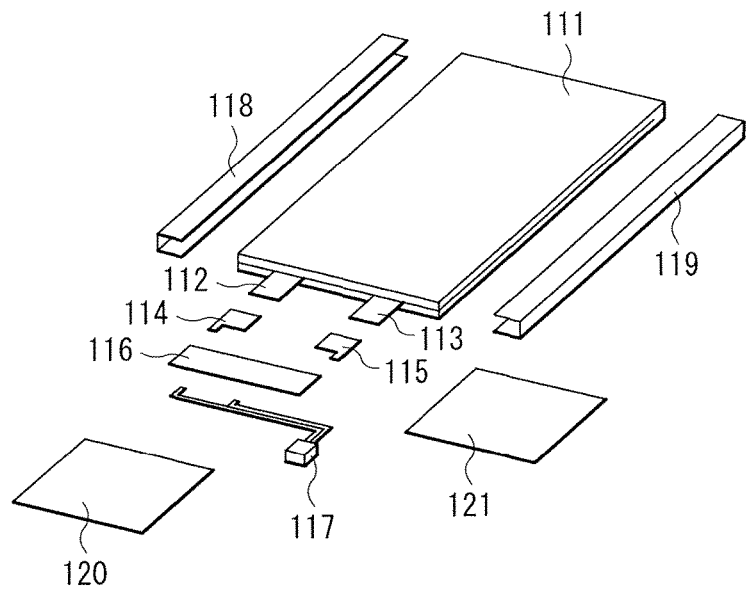
FIG. 5 is a perspective view illustrating a configuration of an application example (a battery pack: a single battery) of the secondary battery.
Figure 6:
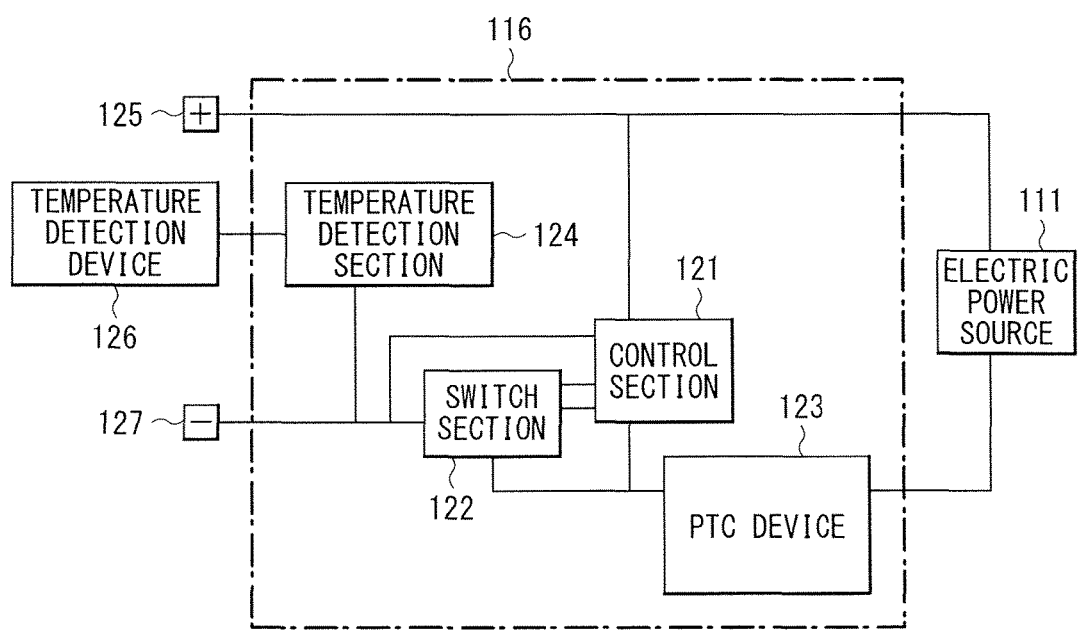
FIG. 6 is a block diagram illustrating the configuration of the battery pack illustrated in FIG. 5.

FIG. 5 illustrates a perspective configuration of a battery pack that uses a single battery. FIG. 6 illustrates a block configuration of the battery pack illustrated in FIG. 5. It is to be noted that FIG. 5 illustrates a decomposed state of the battery pack.

The battery pack described below is a simplified battery pack (a so-called soft pack) that uses one secondary battery, and may be built in an electronic apparatus such as a smartphone, for example. As illustrated in FIG. 5, the battery pack may include, for example, an electric power source 111 configured of a laminated-film-type secondary battery, and a circuit substrate 116 connected to the electric power source 111. A cathode lead 112 and an anode lead 113 are attached to the electric power source 111.

A pair of adhesive tapes 118 and 119 is attached to both side surfaces of the electric power source 111. A protection circuit (PCM: Protection Circuit Module) is formed on the circuit substrate 116. The circuit substrate 116 is connected to the cathode lead 112 via a tab 114 and to the anode lead 113 via a tab 115. Also, the circuit substrate 116 is connected to a lead line 117 provided with a connector for external connection. It is to be noted that the circuit substrate 116 is protected from the upper and lower sides thereof by a label 120 and an insulating sheet 121, in a state of being connected to the electric power source 111. The circuit substrate 116, the insulating sheet 121, etc. are fixed due to the attachment of the label 120.

Also, the battery pack may include, for example, the electric power source 111 and the circuit substrate 116, as illustrated in FIG. 6. The circuit substrate 116 may include, for example, a control section 121, a switch section 122, a PTC device 123, and a temperature detection section 124. The electric power source 111 is connectable to the outside via a cathode terminal 125 and an anode terminal 127. The electric power source 111 is therefore charged and discharged via the cathode terminal 125 and the anode terminal 127. The temperature detection section 124 is capable of detecting temperature with the use of a temperature detection device (a so-called T terminal) 126.

The control section 121 controls operations of the whole battery pack (including a used state of the electric power source 111), and may include, for example, a central processing unit (CPU), a memory, and/or the like.

For example, when a battery voltage reaches an overcharge detection voltage, the control section 121 may cause the switch section 122 to be disconnected so that a charge current does not flow into a current path of the electric power source 111. Also, for example, when a large current flows at the time of the charge operation, the control section 121 may cause the switch section 122 to be disconnected to block the charge current.

Other than the above, for example, when the battery voltage reaches an overdischarge detection voltage, the control section 121 may cause the switch section 122 to be disconnected so that a discharge current does not flow into a current path of the electric power source 111. Also, for example, when a large current flows at the time of the discharge operation, the control section 121 may cause the switch section 122 to be disconnected to block the discharge current.

It is to be noted that the overcharge detection voltage of the secondary battery may be, for example, about 4.20±0.05 V, and the overdischarge detection voltage may be, for example, about 2.4±0.1 V.

The switch section 122 switches the used state of the electric power source 111 (whether or not the electric power source 111 is connectable to an external device) according to an instruction of the control section 121. The switch section 121 may include, for example, a charge control switch, a discharge control switch, and the like. The charge control switch and the discharge control switch may each be, for example, a semiconductor switch such as a field-effect transistor (MOSFET) using a metal oxide semiconductor. It is to be noted that the charge and discharge currents may be detected, for example, based on an ON resistance of the switch section 122.

The temperature detection section 124 measures the temperature of the electric power source 111, and outputs the measurement result to the control section 121. The temperature detection section 124 may include, for example, a temperature detection device such as a thermistor. It is to be noted that the measurement result supplied by the temperature detection section 124 may be used in a case where the control section 121 performs charge and discharge control at the time of abnormal heat generation, in a case where the control section 121 performs a correction process at the time of calculating remaining capacity, etc.

It is to be noted that the circuit substrate 116 may not include the PTC 123. In this case, a PTC element may be provided separately on the circuit substrate 116.

[3-2. Battery Pack (Assembled Battery)]

Figure 7:
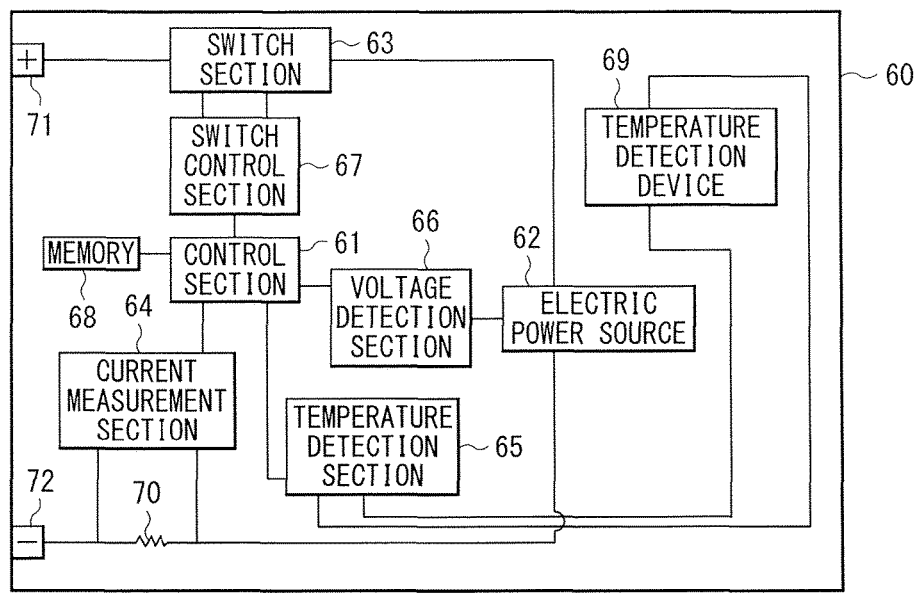
FIG. 7 is a block diagram illustrating a configuration of an application example (a battery pack: an assembled battery) of the secondary battery.

FIG. 7 illustrates a block configuration of a battery pack that uses an assembled battery. For example, the battery pack may include a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 inside a housing 60. The housing 60 may be made, for example, of a plastic material or the like.

The control section 61 controls operations of the whole battery pack (including a used state of the electric power source 62), and may include, for example, a CPU or the like. The electric power source 62 includes one or more secondary batteries of an embodiment of the present application.

The electric power source 62 may be, for example, an assembled battery including two or more secondary batteries. The connection type of the secondary batteries may be a series-connected type, may be a parallel-connected type, or may be a mixed type thereof. To give an example, the electric power source 62 may include six secondary batteries connected in a manner of dual-parallel and three-series.

The switch section 63 switches the used state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection device 69, and outputs the measurement result to the control section 61. The temperature measurement result may be used, for example, for a case in which the control section 61 controls charge and discharge operations at the time of abnormal heat generation or a case in which the control section 61 performs a correction process at the time of calculating remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 may execute control so that a charge current is prevented from flowing in a current path of the electric power source 62 by disconnecting the switch section 63 (charge control switch) in a case where the battery voltage reaches an overcharge detection voltage, for example. Accordingly, in the electric power source 62, only discharge operation is allowed to be performed through the discharging diode. It is to be noted that, for example, in the case where a large current flows at the time of the charge operation, the switch control section 67 blocks the charge current.

Further, the switch control section 67 may cause a discharge current to be prevented from flowing in the current path of the electric power source 62 by disconnecting the switch section 63 (discharge control switch) in a case where the battery voltage reaches an overdischarge detection voltage, for example. Accordingly, in the electric power source 62, only charge operation is allowed to be performed through the charging diode. It is to be noted that, for example, in the case where a large current flows at the time of the discharge operation, the switch control section 67 may block the discharge current.

It is to be noted that, in the secondary battery, for example, the overcharge detection voltage may be about 4.20 V±0.05 V, and the overdischarge detection voltage may be about 2.4 V±0.1 V.

The memory 68 may be, for example, an EEPROM as a non-volatile memory or the like. The memory 68 may store, for example, numerical values calculated by the control section 61 and information of the secondary battery measured in a manufacturing step (such as an internal resistance in the initial state). It is to be noted that, in a case where the memory 68 stores full charge capacity of the secondary battery, the control section 61 is allowed to comprehend information such as remaining capacity.

The temperature detection device 69 measures temperature of the electric power source 62, and outputs the measurement result to the control section 61. The temperature detection device 69 may be, for example, a thermistor or the like.

The cathode terminal 71 and the anode terminal 72 are terminals connected to an external device (such as a notebook personal computer) driven with the use of the battery pack or an external device (such as a battery charger) used for charging the battery pack. The electric power source 62 is charged and discharged via the cathode terminal 71 and the anode terminal 72.

[3-3. Electric Vehicle]

Figure 8:
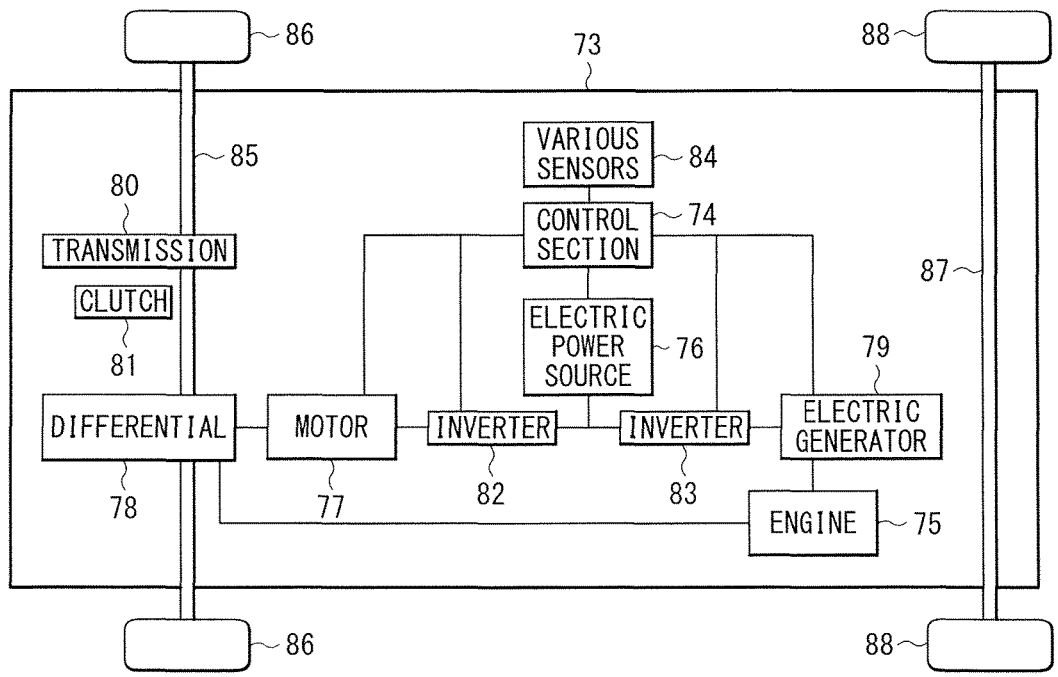
FIG. 8 is a block diagram illustrating a configuration of an application example (an electric vehicle) of the secondary battery.

FIG. 8 illustrates a block configuration of a hybrid automobile as an example of electric vehicles. For example, the electric vehicle may include a control section 74, an engine 75, an electric power source 76, a driving motor 77, a differential 78, an electric generator 79, a transmission 80, a clutch 81, inverters 82 and 83, and various sensors 84, in a housing 73 made of metal. In addition thereto, the electric vehicle may include a front drive shaft 85 and a front tire 86 that are connected to the differential 78 and the transmission 80, and may include a rear drive shaft 87 and a rear tire 88, for example.

The electric vehicle may run with the use of for example, one of the engine 75 and the motor 77 as a drive source. The engine 75 is a main power source, and may be, for example, a petrol engine. In a case where the engine 75 is used as a power source, drive power (torque) of the engine 75 may be transferred to the front tire 86 or the rear tire 88 via the differential 78, the transmission 80, and the clutch 81 as drive sections, for example. The torque of the engine 75 may also be transferred to the electric generator 79. With the use of the torque, the electric generator 79 generates alternating-current electric power. The generated alternating-current electric power is converted into direct-current electric power via the inverter 83, and the converted power is accumulated in the electric power source 76. On the other hand, in a case where the motor 77 as a conversion section is used as a power source, electric power (direct-current electric power) supplied from the electric power source 76 is converted into alternating-current electric power via the inverter 82. The motor 77 is driven with the use of the alternating-current electric power. Drive power (torque) obtained by converting the electric power by the motor 77 may be transferred to the front tire 86 or the rear tire 88 via the differential 78, the transmission 80, and the clutch 81 as the drive sections, for example.

It is to be noted that, alternatively, the following mechanism may be employed. In the mechanism, when speed of the electric vehicle is reduced by an unillustrated brake mechanism, the resistance at the time of speed reduction is transferred to the motor 77 as torque, and the motor 77 generates alternating-current electric power by utilizing the torque. Preferably, the alternating-current electric power may be converted into direct-current electric power via the inverter 82, and the direct-current regenerative electric power may be accumulated in the electric power source 76.

The control section 74 controls operations of the whole electric vehicle, and, for example, may include a CPU and/or the like. The electric power source 76 includes one or more secondary batteries of an embodiment of the present application. Alternatively, the electric power source 76 may be connected to an external electric power source, and electric power may be accumulated by receiving the electric power from the external electric power source. The various sensors 84 may be used, for example, for controlling the number of revolutions of the engine 75 or for controlling an opening level (throttle opening level) of an unillustrated throttle valve. The various sensors 84 may include, for example, a speed sensor, an acceleration sensor, an engine frequency sensor, and/or the like.

The description has been provided above of the case where the electric vehicle is a hybrid automobile. However, examples of the electric vehicles may include a vehicle (electric automobile) that operates with the use of only the electric power source 76 and the motor 77 without using the engine 75.

[3-4. Electric Power Storage System]

Figure 9:
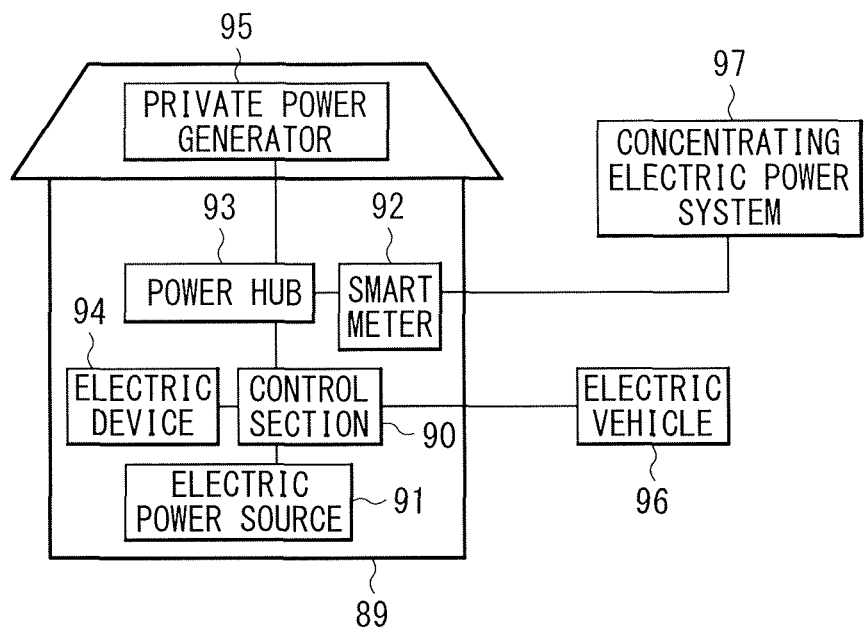
FIG. 9 is a block diagram illustrating a configuration of an application example (an electric power storage system) of the secondary battery.

FIG. 9 illustrates a block configuration of an electric power storage system. For example, the electric power storage system may include a control section 90, an electric power source 91, a smart meter 92, and a power hub 93, inside a house 89 such as a general residence or a commercial building.

In this case, the electric power source 91 may be connected to, for example, an electric device 94 provided inside the house 89, and may be connectable to an electric vehicle 96 parked outside the house 89. Further, for example, the electric power source 91 may be connected to a private power generator 95 provided in the house 89 via the power hub 93, and may be connectable to an external concentrating electric power system 97 via the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls operation of the whole electric power storage system (including a used state of the electric power source 91), and, for example, may include a CPU and/or the like. The electric power source 91 includes one or more secondary batteries of an embodiment of the present application. The smart meter 92 may be, for example, an electric power meter compatible with a network provided in the house 89 demanding electric power, and may be communicable with an electric power supplier. Accordingly, for example, while the smart meter 92 communicates with outside, the smart meter 92 may control the balance between supply and demand in the house 89, thereby allowing effective and stable energy supply.

In the electric power storage system, for example, electric power may be accumulated in the electric power source 91 from the concentrating electric power system 97 as an external electric power source via the smart meter 92 and the power hub 93, and electric power may be accumulated in the electric power source 91 from the private power generator 95 as an independent electric power source via the power hub 93. The electric power accumulated in the electric power source 91 is supplied to the electric device 94 and the electric vehicle 96 according to an instruction of the control section 90. Therefore, the electric device 94 becomes operable, and the electric vehicle 96 becomes chargeable. That is, the electric power storage system is a system capable of accumulating and supplying electric power in the house 89 with the use of the electric power source 91.

The electric power accumulated in the electric power source 91 is arbitrarily usable. Therefore, for example, electric power is allowed to be accumulated in the electric power source 91 from the concentrating electric power system 97 in the middle of the night when an electric rate is inexpensive, and the electric power accumulated in the electric power source 91 is allowed to be used during daytime hours when the electric rate is expensive.

It is to be noted that the foregoing electric power storage system may be provided for each household (family unit), or may be provided for a plurality of households (family units).

[3-5. Electric Power Tool]

Figure 10:
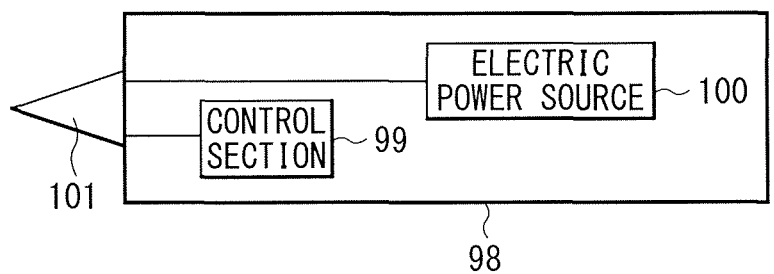
FIG. 10 is a block diagram illustrating a configuration of an application example (an electric power tool) of the secondary battery.

FIG. 10 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including a used state of the electric power source 100), and may include, for example, a CPU and/or the like. The electric power source 100 includes one or more secondary batteries of an embodiment of the present application. The control section 99 allows electric power to be supplied from the electric power source 100 to the drill section 101 according to operation of an unillustrated operation switch.

EXAMPLES

Specific examples of an embodiment of the present application are described in detail.

Examples 1-1 to 1-14

Figure 11:
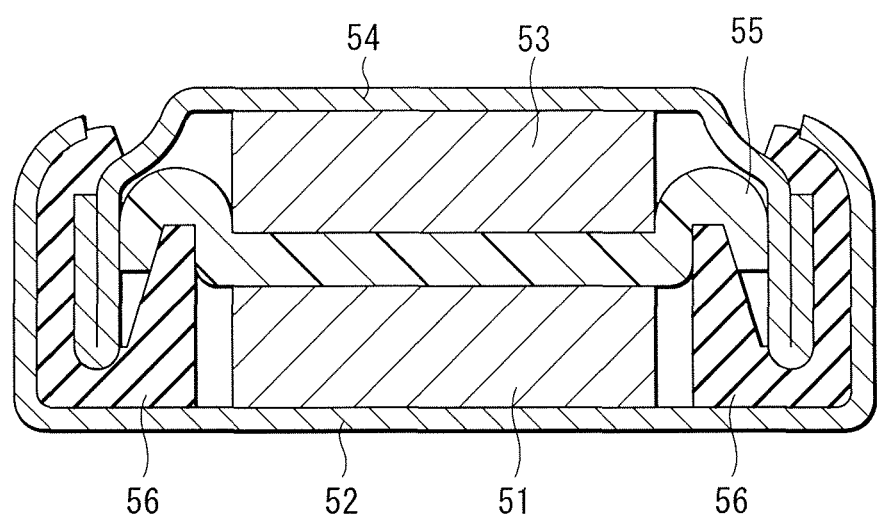
FIG. 11 is a cross-sectional view illustrating a configuration of a test secondary battery (of a coin type).

A coin-type lithium ion secondary battery illustrated in FIG. 11 was fabricated as a test secondary battery by the following procedure. In the secondary battery, a test electrode 51 (anode) and a counter electrode 53 (cathode) were laminated with a separator 55 in between, and an outer package can 52 containing the test electrode 51 and an outer package cup 54 containing the counter electrode 53 were swaged with a gasket 56.

When fabricating the counter electrode 53, first, 91 parts by mass of a cathode active material (LCO=LiCoO$_2$), 3 parts by mass of a cathode binder (polyvinylidene fluoride), and 6 parts by mass of a cathode electric conductor (graphite) were mixed to obtain a cathode mixture. Subsequently, the cathode mixture was dispersed in an organic solvent (N-methyl-2-pyrrolidone) to obtain paste cathode mixture slurry. Subsequently, the cathode mixture slurry was applied onto both surfaces of the cathode current collector (a strip-shaped aluminum foil being 20 μm thick) with the use of a coating apparatus, and the applied cathode mixture slurry was dried to form the cathode active material layers. Lastly, the cathode active material layers were compression-molded with the use of a roll pressing machine.

When fabricating the test electrode 51, first, 90 parts by mass of an anode active material (graphite) and 10 parts by mass of an anode binder (polyvinylidene fluoride), were mixed to obtain an anode mixture. Subsequently, the anode mixture was dispersed in an organic solvent (N-methyl-2-pyrrolidone) to obtain paste anode mixture slurry. Subsequently, the anode mixture slurry was applied onto both surfaces of the anode current collector (a strip-shaped electrolyte copper foil being 15 μm thick) with the use of a coating apparatus, and the applied anode mixture slurry was dried to form the anode active material layers. Lastly, the anode active material layers were compression-molded with the use of a roll pressing machine.

When preparing the electrolytic solution, electrolyte salt (LiPF$_6$) was dissolved in a solvent. As the solvent, a mixture solvent of ethylene carbonate (EC), ethyl methyl carbonate (EMC), and vinylene carbonate (VC) was used. In this case, a mixture ratio (weight ratio) of ethylene carbonate and ethyl methyl carbonate was set as ethylene carbonate: ethyl methyl carbonate=50:50, and a content of vinylene carbonate in the mixture of ethylene carbonate and ethyl methyl carbonate was set as 2 wt %. Further, a content of the electrolyte salt was set as 1 mol/kg with respect to the solvent. Subsequently, the boron compound was added to the mixture of the solvent and the electrolyte salt, and the resultant mixture was stirred, as necessary. Presence or absence of the boron compound, the kind thereof, and the content (wt %) thereof in the electrolytic solution were as shown in Table 1.

When assembling the secondary battery, the test electrode 51 was punched into a pellet-like shape, and the pellet-like test electrode 51 was then contained in the outer package can 52. Subsequently, the counter electrode 53 was punched into a pellet-like shape, and the pellet-like counter electrode 53 was then contained in the outer package cup 54. Subsequently, the test electrode 51 contained in the outer package can 52 and the counter electrode 53 contained in the outer package cup 54 were laminated with the separator 55 (a porous polyolefin film being 23 μm thick), and the outer package can 52 and the outer package cup 54 were swaged with the gasket 56 thereafter. Thus, the coin-type secondary battery was completed.

Battery characteristics (load characteristics) of the secondary battery were examined, and results shown in Table 1 were obtained thereby.

When examining the load characteristics, first, in order to stabilize the battery state, the secondary battery was charged and discharged for 1 cycle under an ambient temperature environment (23 deg C.). Subsequently, the secondary battery was charged and discharged again under the same environment, and discharge capacity at the 2nd cycle was measured. Subsequently, the secondary battery was charged and discharged under a high temperature environment (60 deg C.) until the total cycle number reached 100 cycles, and discharge capacity at the 100th cycle was measured. Based on this result, load retention rate (%)=(discharge capacity at the 100th cycle/discharge capacity at the 2nd cycle)×100 was calculated.

At the time of the charge operation, the secondary battery was charged at a current of 0.2 C until a voltage reached 4.2 V, and was further charged retaining the voltage of 4.2 V until the current reached 0.05 C. At the time of the discharge operation, the secondary battery was discharged at a current of 1 C until the voltage reached 2.5 V. 0.2 C is a value of current by which the battery capacity (theoretical capacity) is completely discharged in 5 hours. Similarly, 0.05 C is a value of current by which the battery capacity is completely discharged in 20 hours, and 1 C is a value of current by which the battery capacity is completely discharged in 1 hour.

TABLE 1

| Example | Cathode active material | Anode active material | Electrolyte salt | Solvent | Boron compound Kind | Content (wt %) | Load retention rate (%) |
|---|---|---|---|---|---|---|---|
| 1-1 | LCO | Graphite | LiPF$_6$ | EC + EMC + VC | B$_6$H$_{10}$ | 1 | 70 |
| 1-2 | | | | | B$_{10}$H$_{14}$ | 1 | 73 |
| 1-3 | | | | | B$_{18}$H$_{22}$ | 1 | 72 |
| 1-4 | | | | | C$_2$B$_{10}$H$_{12}$ | 1 | 70 |
| 1-5 | | | | | Cs[C$_2$B$_9$H$_{12}$] | 1 | 72 |
| 1-6 | | | | | Cs[Co(C$_2$B$_9$H$_{12}$)$_2$] | 0.01 | 61 |
| 1-7 | | | | | | 0.1 | 65 |
| 1-8 | | | | | | 0.5 | 66 |
| 1-9 | | | | | | 1 | 75 |
| 1-10 | | | | | | 1.5 | 66 |
| 1-11 | | | | | K[Co(C$_2$B$_9$H$_{12}$)$_2$] | 1 | 68 |
| 1-12 | | | | | (C$_4$H$_9$)$_4$N[Co(C$_2$B$_9$H$_{12}$)$_2$] | 1 | 70 |
| 1-13 | | | | | (CH$_3$)$_3$NH[Co(C$_2$B$_9$H$_{12}$)$_2$] | 1 | 69 |
| 1-14 | LCO | Graphite | LiPF$_6$ | EC + EMC + VC | — | — | 52 |

When the carbon material (graphite) was used as the anode active material, in cases (Examples 1-1 to 1-13) where the electrolytic solution included the boron compound, the load retention rate was largely increased compared to a case (Example 1-14) where the electrolytic solution included no boron compound. In these cases, the load retention rate was increased independently from whether the boron compound was the first boron compound (Examples 1-1 to 1-3), the second boron compound (Example 1-4), the third boron compound (Example 1-5), or the fourth boron compound (Examples 1-6 to 1-13).

In particular, when the content of the boron compound in the electrolytic solution was from 0.01 wt % to 1.5 wt % both inclusive, a high load retention rate was achieved.

Examples 2-1 to 2-9

As shown in Table 2, the secondary battery was fabricated by a similar procedure except that the composition of the electrolytic solution (the kind of the electrolyte salt, the kind of the solvent, and presence or absence of the additive) was changed, and battery characteristics thereof were examined.

As the electrolyte salt, lithium tetrafluoroborate (LiBF$_4$), the compound (LiBOB) represented by Formula (9-6), bis(pentafluoroethanesulfonyl) imide lithium (LiBETI), bis(trifluoromethanesulfonyl) imide lithium (LiTFSI), and bis(fluorosulfonyl) imide lithium (LiFSI) were newly used, and two kinds of electrolyte salts were mixed as necessary. When mixing two kinds of electrolyte salts, a content of each of the electrolyte salts was set as 0.5 mol/kg with respect to the solvent.

As the solvent, 4-fluoro-1,3-dioxolane-2-one (FEC) that was halogenated ester carbonate and propane sultone (PS) that was ester sulfonate were newly used. In this case, a content of the new solvent in the electrolytic solution was set as 3 wt %.

As the additive, LiPF$_2$O$_2$ and Li$_2$PFO$_3$ were used. In this case, a content of the additive in the electrolytic solution was set as 3 wt %.

TABLE 2

| Example | Cathode active material | Anode active material | Electrolyte salt | Solvent | Boron compound Kind | Content (wt %) | Load retention rate (%) |
|---|---|---|---|---|---|---|---|
| 2-1 | LCO | Graphite | LiBF$_4$ | EC + EMC + VC | Cs[Co(C$_2$B$_9$H$_{12}$)$_2$] | 1 | 71 |
| 2-2 | | | LiBOB | | | | 69 |
| 2-3 | | | LiBETI | | | | 74 |
| 2-4 | | | LiPF$_6$ + LiTFSI | | | | 70 |
| 2-5 | | | LiPF$_6$ + LiFSI | | | | 66 |
| 2-6 | | | LiPF$_6$ | EC + EMC + VC + FEC | | | 82 |
| 2-7 | | | | EC + EMC + VC + PS | | | 84 |
| 2-8 | | | | EC + EMC + VC + LiPF$_2$O$_2$ | | | 81 |
| 2-9 | | | | EC + EMC + VC + Li$_2$PFO$_3$ | | | 81 |

Also when the composition of the electrolytic solution was changed, results similar to those in Table 1 were obtained. Specifically, in cases (Examples 2-1 to 2-9) where the electrolytic solution included the boron compound, a high load retention rate was achieved. In particular, in cases (Examples 2-6 to 2-9) where the solvent in the electrolytic solution included halogenated ester carbonate or ester sulfonate, the load retention rate was further increased.

Examples 3-1 to 3-10

As shown in Table 3, the secondary battery was fabricated by a similar procedure except that the kind of the anode active material was changed, and the battery characteristics thereof were examined.

In a case where a metal-based material (silicon) was used as the anode active material, the test electrode 51 was formed by a similar procedure except that silicon was used instead of graphite. Thus, a lithium ion secondary battery was fabricated.

In a case where lithium metal was used as the anode active material, the test electrode 51 was formed by a similar procedure except that a lithium metal plate was used instead of the anode active material layer. Thus, a lithium metal secondary battery was fabricated.

It is to be noted that, in the case where the kind of the anode active material was changed, a mixture of ethylene carbonate and ethyl methyl carbonate was used as the solvent of the electrolytic solution.

TABLE 3

| Example | Cathode active material | Anode active material | Electrolyte salt | Solvent | Boron compound Kind | Content (wt %) | Load retention rate (%) |
|---|---|---|---|---|---|---|---|
| 3-1 | LCO | Silicon | LiPF$_6$ | EC + EMC | B$_{10}$H$_{14}$ | 1 | 56 |
| 3-2 | | | | | C$_2$B$_{10}$H$_{12}$ | 1 | 55 |
| 3-3 | | | | | Cs[C$_2$B$_9$H$_{12}$] | 1 | 59 |
| 3-4 | | | | | Cs[Co(C$_2$B$_9$H$_{12}$)$_2$] | 1 | 59 |
| 3-5 | LCO | Lithium metal | LiPF$_6$ | EC + EMC | B$_{10}$H$_{14}$ | 1 | 46 |
| 3-6 | | | | | C$_2$B$_{10}$H$_{12}$ | 1 | 48 |
| 3-7 | | | | | Cs[C$_2$B$_9$H$_{12}$] | 1 | 52 |
| 3-8 | | | | | Cs[Co(C$_2$B$_9$H$_{12}$)$_2$] | 1 | 48 |
| 3-9 | LCO | Silicon | LiPF$_6$ | EC + EMC | — | — | 40 |
| 3-10 | LCO | Lithium metal | LiPF$_6$ | EC + EMC | — | — | 31 |

Also when the kind of the anode active material was changed, results similar to those in Table 1 were obtained. Specifically, in cases (Examples 3-1 to 3-8) where the electrolytic solution included the boron compound, the load retention rate was largely increased compared to cases (Examples 3-9 and 3-10) where the electrolytic solution included the boron compound.

Examples 4-1 to 4-15

As shown in Table 4, the secondary battery was fabricated by a similar procedure except that the kind of the cathode active material was changed, and the battery characteristics thereof were examined.

As the cathode active material, Li(Ni$_{0.5}$Co$_{0.2}$Mn$_{0.3}$)O$_2$ (LNCM), (Li$_2$MnO$_3$)$_{0.5}$(LiMnO$_2$)$_{0.5}$ (LMO), and Li(Ni$_{0.8}$Co$_{0.15}$Al$_{0.05}$)O$_2$ (LNCA) were used.

TABLE 4

| Example | Cathode active material | Anode active material | Electrolyte salt | Solvent | Boron compound Kind | Content (wt %) | Load retention rate (%) |
|---|---|---|---|---|---|---|---|
| 4-1 | LNCM | Graphite | LiPF$_6$ | EC + EMC + VC | B$_{10}$H$_{14}$ | 1 | 58 |
| 4-2 | | | | | C$_2$B$_{10}$H$_{12}$ | 1 | 63 |
| 4-3 | | | | | Cs[C$_2$B$_9$H$_{12}$] | 1 | 59 |
| 4-4 | | | | | Cs[Co(C$_2$B$_9$H$_{12}$)$_2$] | 1 | 68 |
| 4-5 | LMO | Graphite | LiPF$_6$ | EC + EMC + VC | B$_{10}$H$_{14}$ | 1 | 59 |
| 4-6 | | | | | C$_2$B$_{10}$H$_{12}$ | 1 | 66 |
| 4-7 | | | | | Cs[C$_2$B$_9$H$_{12}$] | 1 | 59 |
| 4-8 | | | | | Cs[Co(C$_2$B$_9$H$_{12}$)$_2$] | 1 | 59 |
| 4-9 | LNCA | Graphite | LiPF$_6$ | EC + EMC + VC | B$_{10}$H$_{14}$ | 1 | 67 |
| 4-10 | | | | | C$_2$B$_{10}$H$_{12}$ | 1 | 61 |
| 4-11 | | | | | Cs[C$_2$B$_9$H$_{12}$] | 1 | 68 |

TABLE 4-continued

| Example | Cathode active material | Anode active material | Electrolyte salt | Solvent | Boron compound Kind | Boron compound Content (wt %) | Load retention rate (%) |
|---|---|---|---|---|---|---|---|
| 4-12 | | | | | Cs[Co(C$_2$B$_9$H$_{12}$)$_2$] | 1 | 65 |
| 4-13 | LNCA | Graphite | LiPF$_6$ | EC + EMC + VC | — | — | 44 |
| 4-14 | LMO | Graphite | | | — | — | 40 |
| 4-15 | LNCA | Graphite | | | — | — | 42 |

Also when the kind of the cathode active material was changed, results similar to those in Table 1 were obtained. Specifically, in cases (Examples 4-1 to 4-12) where the electrolytic solution included the boron compound, the load retention rate was largely increased compared to cases (Examples 4-13 to 4-15) where the electrolytic solution included no boron compound.

As can be seen from the results in Tables 1 to 4, the load characteristics were improved when the electrolytic solution included the boron compound. Accordingly, superior battery characteristics were achieved.

Hereinabove, the present application was described referring to some embodiments and Examples thereof. However, the present application is not limited to the examples described in the embodiments and the Examples, and various modifications may be made.

For example, description has been provided referring, as an example, to the cases where the respective battery structures were of a cylindrical type and a laminated film type, and to the cases where the battery device has a spirally wound structure. However, the present application is not limited to these cases. The secondary battery of an embodiment of the present application is similarly applicable to a case where the secondary battery has other battery structure such as that of a square type, a coin type, and a button type, and to a case where the battery device has other structure such as a laminated structure.

Moreover, for example, the electrode reactant may be other Group 1 element such as sodium (Na) or potassium (K), may be a Group 2 element such as magnesium or calcium, or may be other light metal such as aluminum. An effect of the present application is achievable independently of the kind of the electrode reactant, and a similar effect is therefore achieved also when the kind of the electrode reactant is changed.

It is possible to achieve at least the following configurations from the above-described example embodiments and the modifications of the technology.

[1] A secondary battery, including:
a cathode;
an anode; and
non-aqueous electrolytic solution including a boron compound, the boron compound including six or more boron (B) atoms, and including an octavalent boron-hydrogen-containing structure represented by Formula (1), a dodecavalent boron-carbon-containing structure represented by Formula (2), or both.

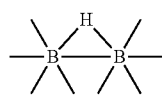
(1)

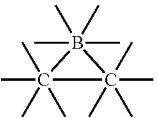
(2)

[2] The secondary battery according to [1], wherein the boron compound includes one or more of compounds represented by respective Formulas (3) to (6):

$$B_xH_y \quad (3)$$

where x is an integer from 6 to 18 both inclusive, and y is an integer from 10 to 22 both inclusive, $$C_2B_{10}R1_{12} \quad (4)$$

where each of R1s is one of a hydrogen group, a halogen group, a monovalent hydrocarbon group, a monovalent halogenated hydrocarbon group, and a monovalent group obtained by bonding two or more thereof, $$M1^+[C_2B_9R2_{12}]^- \quad (5)$$

where M1$^+$ is one of a monovalent metal cation of a metal element belonging to Group 1 in long form of periodic table and a monovalent non-metal cation represented by NR3$_4^+$; and each of R2s and R3s is one of a hydrogen group, a halogen group, a monovalent hydrocarbon group, a monovalent halogenated hydrocarbon group, and a monovalent group obtained by bonding two or more thereof, $$M2^+[M3(C_2B_9R4_{12})_2]^- \quad (6)$$

where M2$^+$ is one of a monovalent metal cation of a metal element belonging to Group 1 in the long form of periodic table and a monovalent non-metal cation represented by NR5$_4^+$; M3 is a divalent metal element belonging to Groups 2 to 16 in the long form of periodic table; and each of R4s and R5s is one of a hydrogen group, a halogen group, a monovalent hydrocarbon group, a monovalent halogenated hydrocarbon group, and a monovalent group obtained by bonding two or more thereof.

[3] The secondary battery according to [2], wherein
the halogen group is one of a fluorine group (—F), a chlorine group (—Cl), a bromine group (—Br), and an iodine group (—I),
the monovalent hydrocarbon group is one of an alkyl group, an alkenyl group, an alkynyl group, a cycloalkyl group, an aryl group, and a monovalent group obtained by bonding two or more thereof,
the monovalent halogenated hydrocarbon group is a group obtained by substituting one or more halogen groups for one or more hydrogen groups in the monovalent hydrocarbon group,
the monovalent metal cation is one of a lithium ion (Li$^+$), a sodium ion (Na$^+$), a potassium ion (K$^+$), a rubidium ion (Rb$^+$), and a cesium ion (Cs$^+$), the monovalent non-metal cation is one of an ammonium ion ($NH_4^+$), a trimethylammonium ion (($CH_3)_3NH^+$), a triethylammonium ion (($C_2H_5)_3NH^+$), a tripropylammonium ion (($C_3H_7)_3NH^+$), a tributylammonium ion (($C_4H_9)_3NH^+$), a tetramethylammonium ion (($CH_3)_4N^+$), a tetraethylammonium ion (($C_2H_5)_4N^+$), and a tetrabutylammonium ion (($C_4H_9)_4N^+$), and the divalent metal element is one of cobalt (Co) and nickel (Ni).

[4] The secondary battery according to [2] or [3], wherein the boron compound represented by Formula (3) is one of $B_6H_{10}$, $B_{10}H_{14}$, and $B_{18}H_{22}$, the boron compound represented by Formula (4) is one of $C_2B_{10}H_{12}$, $C_2B_{10}H_{11}CH_3$, and $C_2B_{10}H_{11}C_6H_5$, the boron compound represented by Formula (5) is one of $Li[C_2B_9H_{12}]$, $Cs[C_2B_9H_{12}]$, and $(C_2H_5)_3NH[C_2B_9H_{12}]$, and the boron compound represented by Formula (6) is one of $Cs[Co(C_2B_9H_{12})_2]$, $K[Co(C_2B_9H_{12})_2]$, $(C_4H_9)_4N[Co(C_2B_9H_{12})_2]$, $(CH_3)_3NH[Co(C_2B_9H_{12})_2]$, and $(C_2H_5)_3NH[Co(C_2B_9H_{12})_2]$.

[5] The secondary battery according to any one of [1] to [4], wherein a content of the boron compound in the non-aqueous electrolytic solution is from about 0.01 weight percent to about 1.5 weight percent both inclusive.

[6] The secondary battery according to any one of [1] to [5], wherein the secondary battery is a lithium secondary battery.

[7] Non-aqueous electrolytic solution, including a boron compound, the boron compound including six or more boron (B) atoms, and including an octavalent boron-hydrogen-containing structure represented by Formula (1), a dodecavalent boron-carbon-containing structure represented by Formula (2), or both.

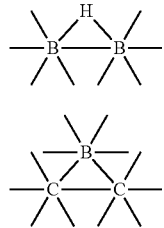

[8] A battery pack, including:

the secondary battery according to any one of [1] to [6];

a control section configured to control operation of the secondary battery; and a switch section configured to switch the operation of the secondary battery according to an instruction of the control section.

[9] An electric vehicle, including:

the secondary battery according to any one of [1] to [6];

a conversion section configured to convert electric power supplied from the secondary battery into drive power;

a drive section configured to operate according to the drive power; and a control section configured to control operation of the secondary battery.

[10] An electric power storage system, including:

the secondary battery according to any one of [1] to [6];

one or more electric devices configured to be supplied with electric power from the secondary battery; and a control section configured to control the supplying of the electric power from the secondary battery to the one or more electric devices.

[11] An electric power tool, including:

the secondary battery according to any one of [1] to [6]; and a movable section configured to be supplied with electric power from the secondary battery.

[12] An electronic apparatus, including the secondary battery according to any one of [1] to [6] as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery, comprising:
   a cathode;
   an anode; and
   non-aqueous electrolytic solution including a boron compound, the boron compound including six or more boron (B) atoms, and including an octavalent boron-hydrogen-containing structure represented by Formula (1), a dodecavalent boron-carbon-containing structure represented by Formula (2), or both,

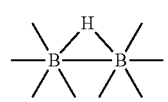

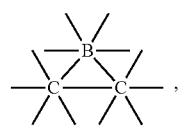

wherein the boron compound includes at least one compound that (i) consists of boron and hydrogen as constituent elements, (ii) includes the octavalent boron-hydrogen-containing structure represented by Formula (1) and (iii) is represented by Formula (3):

$$B_xH_y \quad (3),$$

where x is an integer from 6 to 18 both inclusive, and y is an integer from 10 to 22 both inclusive.

2. The secondary battery according to claim 1, wherein the boron compound further includes one or more of compounds represented by respective Formulas (4) to (6):

$$C_2B_{10}R1_{12} \quad (4)$$

where each of R1s is one of a hydrogen group, a halogen group, a monovalent hydrocarbon group, a monovalent halogenated hydrocarbon group, and a monovalent group obtained by bonding two or more thereof, $$M1^+[C_2B_9R2_{12}]^- \quad (5)$$

where $M1^+$ is one of a monovalent metal cation of a metal element belonging to Group 1 in long form of periodic table and a monovalent non-metal cation represented by $NR3_4^+$; and each of R2s and R3s is one of a hydrogen group, a halogen group, a monovalent hydrocarbon group, a monovalent halogenated hydrocarbon group, and a monovalent group obtained by bonding two or more thereof,

    (6)

where $M2^+$ is one of a monovalent metal cation of a metal element belonging to Group 1 in the long form of periodic table and a monovalent non-metal cation represented by $NR5_4^+$; M3 is a divalent metal element belonging to Groups 2 to 16 in the long form of periodic table; and each of R4s and R5s is one of a hydrogen group, a halogen group, a monovalent hydrocarbon group, a monovalent halogenated hydrocarbon group, and a monovalent group obtained by bonding two or more thereof.

3. The secondary battery according to claim 2, wherein the halogen group is one of a fluorine group (—F), a chlorine group (—Cl), a bromine group (—Br), and an iodine group (—I),
the monovalent hydrocarbon group is one of an alkyl group, an alkenyl group, an alkynyl group, a cycloalkyl group, an aryl group, and a monovalent group obtained by bonding two or more thereof,
the monovalent halogenated hydrocarbon group is a group obtained by substituting one or more halogen groups for one or more hydrogen groups in the monovalent hydrocarbon group,
the monovalent metal cation is one of a lithium ion ($Li^+$), a sodium ion ($Na^+$), a potassium ion ($K^+$), a rubidium ion ($Rb^+$), and a cesium ion ($Cs^+$),
the monovalent non-metal cation is one of an ammonium ion ($NH_4^+$), a trimethylammonium ion (($CH_3)_3NH^+$), a triethylammonium ion (($C_2H_5)_3NH^+$), a tripropylammonium ion (($C_3H_7)_3NH^+$), a tributylammonium ion (($C_4H_9)_3NH^+$), a tetramethylammonium ion (($CH_3)_4N^+$), a tetraethylammonium ion (($C_2H_5)_4N^+$), and a tetrabutylammonium ion (($C_4H_9)_4N^+$), and
the divalent metal element is one of cobalt (Co) and nickel (Ni).

4. The secondary battery according to claim 2, wherein the boron compound represented by Formula (3) is one of $B_6H_{10}$, $B_{10}H_{14}$, and $B_{18}H_{22}$,
the boron compound represented by Formula (4) is one of $C_2B_{10}H_{12}$, $C_2B_{10}H_{11}CH_3$, and $C_2B_{10}H_{11}C_6H_5$,
the boron compound represented by Formula (5) is one of $Li[C_2B_9H_{12}]$, $Cs[C_2B_9H_{12}]$, and $(C_2H_5)_3NH[C_2B_9H_{12}]$, and
the boron compound represented by Formula (6) is one of $Cs[Co(C_2B_9H_{12})_2]$, $K[Co(C_2B_9H_{12})_2]$, $(C_4H_9)_4N[Co(C_2B_9H_{12})_2]$, $(CH_3)_3NH[Co(C_2B_9H_{12})_2]$, and $(C_2H_5)_3NH[Co(C_2B_9H_{12})_2]$.

5. The secondary battery according to claim 1, wherein a content of the boron compound in the non-aqueous electrolytic solution is from about 0.01 weight percent to about 1.5 weight percent both inclusive.

6. The secondary battery according to claim 1, wherein the secondary battery is a lithium secondary battery.

7. A non-aqueous electrolytic solution, comprising a boron compound,
the boron compound including six or more boron (B) atoms, and including an octavalent boron-hydrogen-containing structure represented by Formula (1), a dodecavalent boron-carbon-containing structure represented by Formula (2), or both,

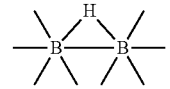    (1)

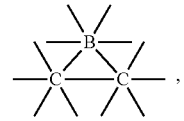    (2)

wherein the boron compound includes at least one compound that (i) consists of boron and hydrogen as constituent elements, (ii) includes the octavalent boron-hydrogen-containing structure represented by Formula (1) and (iii) is represented by Formula (3):

$B_xH_y$    (3), where x is an integer from 6 to 18 both inclusive, and y is an integer from 10 to 22 both inclusive.

8. A battery pack, comprising:
a secondary battery;
a control section configured to control operation of the secondary battery; and
a switch section configured to switch the operation of the secondary battery according to an instruction of the control section,
the secondary battery including
a cathode,
an anode, and
non-aqueous electrolytic solution including a boron compound, the boron compound including six or more boron (B) atoms, and including an octavalent boron-hydrogen-containing structure represented by Formula (1), a dodecavalent boron-carbon-containing structure represented by Formula (2), or both,

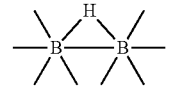    (1)

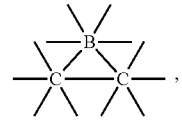    (2)

wherein the boron compound includes at least one compound that (i) consists of boron and hydrogen as constituent elements, (ii) includes the octavalent boron-hydrogen-containing structure represented by Formula (1) and (iii) is represented by Formula (3):

$B_xH_y$    (3), where x is an integer from 6 to 18 both inclusive, and y is an integer from 10 to 22 both inclusive.

9. An electric vehicle, comprising:
a secondary battery;
a conversion section configured to convert electric power supplied from the secondary battery into drive power;
a drive section configured to operate according to the drive power; and
a control section configured to control operation of the secondary battery, the secondary battery including
a cathode,
an anode, and
non-aqueous electrolytic solution including a boron compound, the boron compound including six or more boron (B) atoms, and including an octavalent boron-hydrogen-containing structure represented by Formula (1), a dodecavalent boron-carbon-containing structure represented by Formula (2), or both,

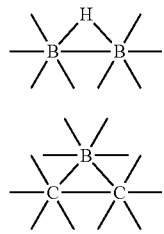

wherein the boron compound includes at least one compound that (i) consists of boron and hydrogen as constituent elements, (ii) includes the octavalent boron-hydrogen-containing structure represented by Formula (1) and (iii) is represented by Formula (3):

$$B_xH_y \quad (3),$$

where x is an integer from 6 to 18 both inclusive, and y is an integer from 10 to 22 both inclusive.

10. An electric power storage system, comprising:
a secondary battery;
one or more electric devices configured to be supplied with electric power from the secondary battery; and
a control section configured to control the supplying of the electric power from the secondary battery to the one or more electric devices,
the secondary battery including
a cathode,
an anode, and
non-aqueous electrolytic solution including a boron compound, the boron compound including six or more boron (B) atoms, and including an octavalent boron-hydrogen-containing structure represented by Formula (1), a dodecavalent boron-carbon-containing structure represented by Formula (2), or both,

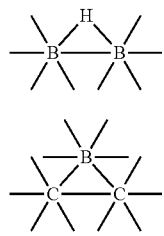

wherein the boron compound includes at least one compound that (i) consists of boron and hydrogen as constituent elements, (ii) includes the octavalent boron-hydrogen-containing structure represented by Formula (1) and (iii) is represented by Formula (3):

$$B_xH_y \quad (3),$$

where x is an integer from 6 to 18 both inclusive, and y is an integer from 10 to 22 both inclusive.

11. An electric power tool, comprising:
a secondary battery; and
a movable section configured to be supplied with electric power from the secondary battery,
the secondary battery including
a cathode,
an anode, and
non-aqueous electrolytic solution including a boron compound, the boron compound including six or more boron (B) atoms, and including an octavalent boron-hydrogen-containing structure represented by Formula (1), a dodecavalent boron-carbon-containing structure represented by Formula (2), or both

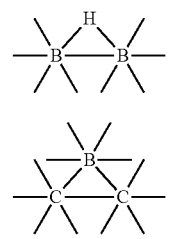

wherein the boron compound includes at least one compound that (i) consists of boron and hydrogen as constituent elements, (ii) includes the octavalent boron-hydrogen-containing structure represented by Formula (1) and (iii) is represented by Formula (3):

$$B_xH_y \quad (3),$$

where x is an integer from 6 to 18 both inclusive, and y is an integer from 10 to 22 both inclusive.

12. An electronic apparatus, comprising
a secondary battery as an electric power supply source,
the secondary battery including
a cathode,
an anode, and
non-aqueous electrolytic solution including a boron compound, the boron compound including six or more boron (B) atoms, and including an octavalent boron-hydrogen-containing structure represented by Formula (1), a dodecavalent boron-carbon-containing structure represented by Formula (2), or both,

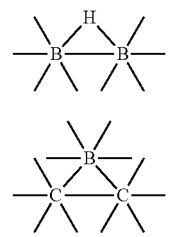

wherein the boron compound includes at least one compound that (i) consists of boron and hydrogen as constituent elements, (ii) includes the octavalent boron-hydrogen-containing structure represented by Formula (1) and (iii) is represented by Formula (3):

$$B_xH_y \quad (3),$$

where x is an integer from 6 to 18 both inclusive, and y is an integer from 10 to 22 both inclusive.

* * * * *